(12) United States Patent
Suzuki et al.

(10) Patent No.: US 10,771,713 B2
(45) Date of Patent: Sep. 8, 2020

(54) IMAGING CONTROL DEVICE, IMAGING CONTROL METHOD, AND PROGRAM

(71) Applicant: SONY CORPORATION, Tokyo (JP)

(72) Inventors: Satoko Suzuki, Tokyo (JP); Yutaro Honda, Kanagawa (JP); Syouei Hirasawa, Tokyo (JP); Osamu Izuta, Tokyo (JP); Daisuke Kasai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/099,379

(22) PCT Filed: May 8, 2017

(86) PCT No.: PCT/JP2017/017403
§ 371 (c)(1),
(2) Date: Nov. 6, 2018

(87) PCT Pub. No.: WO2017/217137
PCT Pub. Date: Dec. 21, 2017

(65) Prior Publication Data
US 2019/0215434 A1    Jul. 11, 2019

(30) Foreign Application Priority Data

Jun. 15, 2016 (JP) ................ 2016-118535
Sep. 14, 2016 (JP) ................ 2016-179442

(51) Int. Cl.
*H04N 5/235* (2006.01)
*H04N 5/353* (2011.01)

(52) U.S. Cl.
CPC ........ *H04N 5/2357* (2013.01); *H04N 5/2352* (2013.01); *H04N 5/2353* (2013.01); *H04N 5/353* (2013.01)

(58) Field of Classification Search
CPC .. H04N 5/2351; H04N 5/2352; H04N 5/2353; H04N 5/2357
See application file for complete search history.

(56) References Cited

U.S. PATENT DOCUMENTS

| | | |
|---|---|---|
| 2005/0200744 A1 | 9/2005 | Kobayashi |
| 2009/0096902 A1 | 4/2009 | Kobayashi |
| 2012/0154628 A1 | 6/2012 | Horiuchi |
| 2012/0154629 A1 | 6/2012 | Horiuchi |

(Continued)

FOREIGN PATENT DOCUMENTS

| | | |
|---|---|---|
| JP | 2015-88917 A | 5/2015 |
| JP | 2015-97326 A | 5/2015 |

(Continued)

OTHER PUBLICATIONS

Extended European Search Report dated Apr. 23, 2019 in European Patent Application No. 17813042.3, 7 pages.

(Continued)

*Primary Examiner* — Daniel M Pasiewicz
(74) *Attorney, Agent, or Firm* — Oblon, McClelland, Maier & Neustadt, L.L.P.

(57) ABSTRACT

An imaging control device including: a control unit configured to perform control such that an exposure timing is synchronized with a timing of a peak of a detected flickering component on a basis of a period of the flickering component and the timing of the peak of the flickering component.

18 Claims, 16 Drawing Sheets

(56) References Cited

U.S. PATENT DOCUMENTS

| | | | |
|---|---|---|---|
| 2013/0293742 A1* | 11/2013 | Moon | G06T 7/254 |
| | | | 348/226.1 |
| 2013/0342726 A1 | 12/2013 | Ebina et al. | |
| 2014/0375838 A1* | 12/2014 | Shimoozono | H04N 5/2357 |
| | | | 348/226.1 |
| 2015/0116537 A1 | 4/2015 | Ariga | |
| 2015/0138392 A1* | 5/2015 | Sugawara | H04N 5/2351 |
| | | | 348/226.1 |
| 2016/0044223 A1 | 2/2016 | Harada | |

FOREIGN PATENT DOCUMENTS

| | | | |
|---|---|---|---|
| JP | 2016-39499 A | 3/2016 | |
| JP | 2016-92786 A | 5/2016 | |

OTHER PUBLICATIONS

International Search Report dated Jul. 18, 2017 in PCT/JP2017/017403, 2 pages.
Office Action dated May 12, 2020, in Japanese Patent Application No. 2018-523573 (with English-language translation).

* cited by examiner

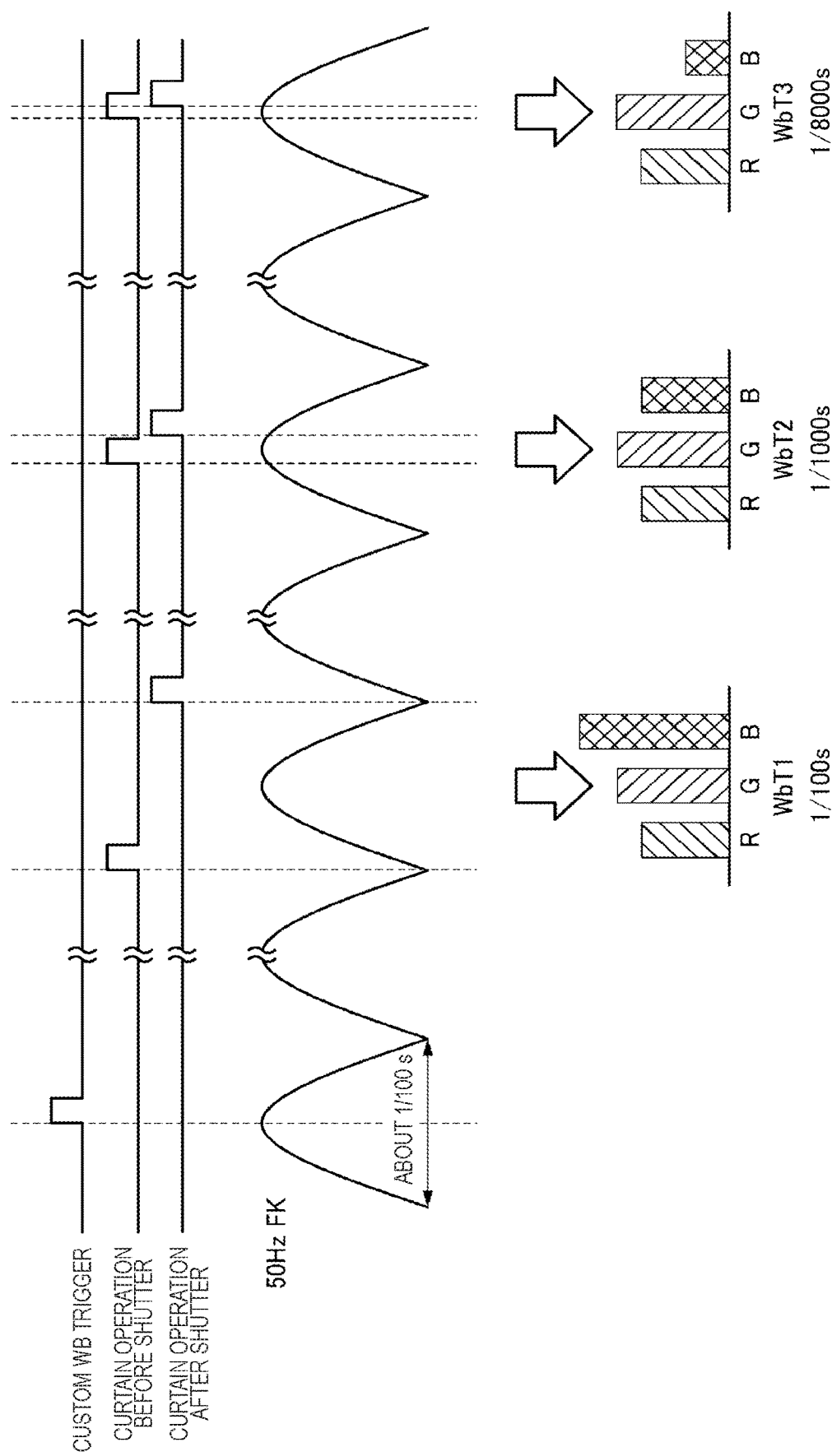

IMAGING CONTROL DEVICE, IMAGING CONTROL METHOD, AND PROGRAM

TECHNICAL FIELD

The present technology relates to an imaging control device, an imaging control method, and a program.

BACKGROUND ART

In fluorescent lamps prevalent as indoor light sources, light emitting diodes (LEDs) that have become more common recently, and the like, so-called flickering in which illumination light periodically blinks due to influences of commercial power frequencies occurs. Technologies related to imaging devices for preventing deterioration in image quality such as color unevenness due to such flickering have been proposed (for example, see Patent Literature 1 below).

CITATION LIST

Patent Literature

Patent Literature 1: JP 2014-220763A

DISCLOSURE OF INVENTION

Technical Problem

In a device in Patent Literature 1, a different sensor from an image sensor (imager) is used to detect flickering. Therefore, there is a problem that it is difficult to miniaturize the device.

The present technology is devised in view of such a problem and one object of the present technology is to provide an imaging control device, an imaging control method, and a program capable of preventing deterioration in image quality due to flickering.

Solution to Problem

In order to solve the above problem, the present technology is, for example, an imaging control device including: a control unit configured to perform control such that an exposure timing is synchronized with a timing of a peak of a detected flickering component on the basis of a period of the flickering component and the timing of the peak of the flickering component.

In addition, the present technology is, for example, an imaging control method including: performing, by a control unit, control such that an exposure timing is synchronized with a timing of a peak of a detected flickering component on the basis of a period of the flickering component and the timing of the peak of the flickering component.

In addition, the present technology is, for example, a program causing a computer to perform an imaging control method of performing, by a control unit, control such that an exposure timing is synchronized with a timing of a peak of a detected flickering component on the basis of a period of the flickering component and the timing of the peak of the flickering component.

Advantageous Effects of Invention

According to at least one embodiment of the present technology, it is possible to prevent deterioration in image quality due to flickering. Note that the effect described above is not necessarily limitative and the effects described in the present technology may be achieved. In addition, content of the present technology is not construed to be limited by the exemplified effects.

BRIEF DESCRIPTION OF DRAWINGS

FIG. 16 is an explanatory diagram illustrating a modification example.

MODE(S) FOR CARRYING OUT THE INVENTION

Hereinafter, embodiments and the like of the present technology will be described with reference to the drawings. Note that the description will be made in the following order.
<1. First embodiment>
<2. Second embodiment>
<3. Other modification examples>

The embodiments and the like to be described below are specific preferred examples of the present technology and content of the present technology is not limited to the embodiments and the like.

1. First Embodiment

Configuration Example of Imaging Device

"Overall Configuration Example"

Figure 1:
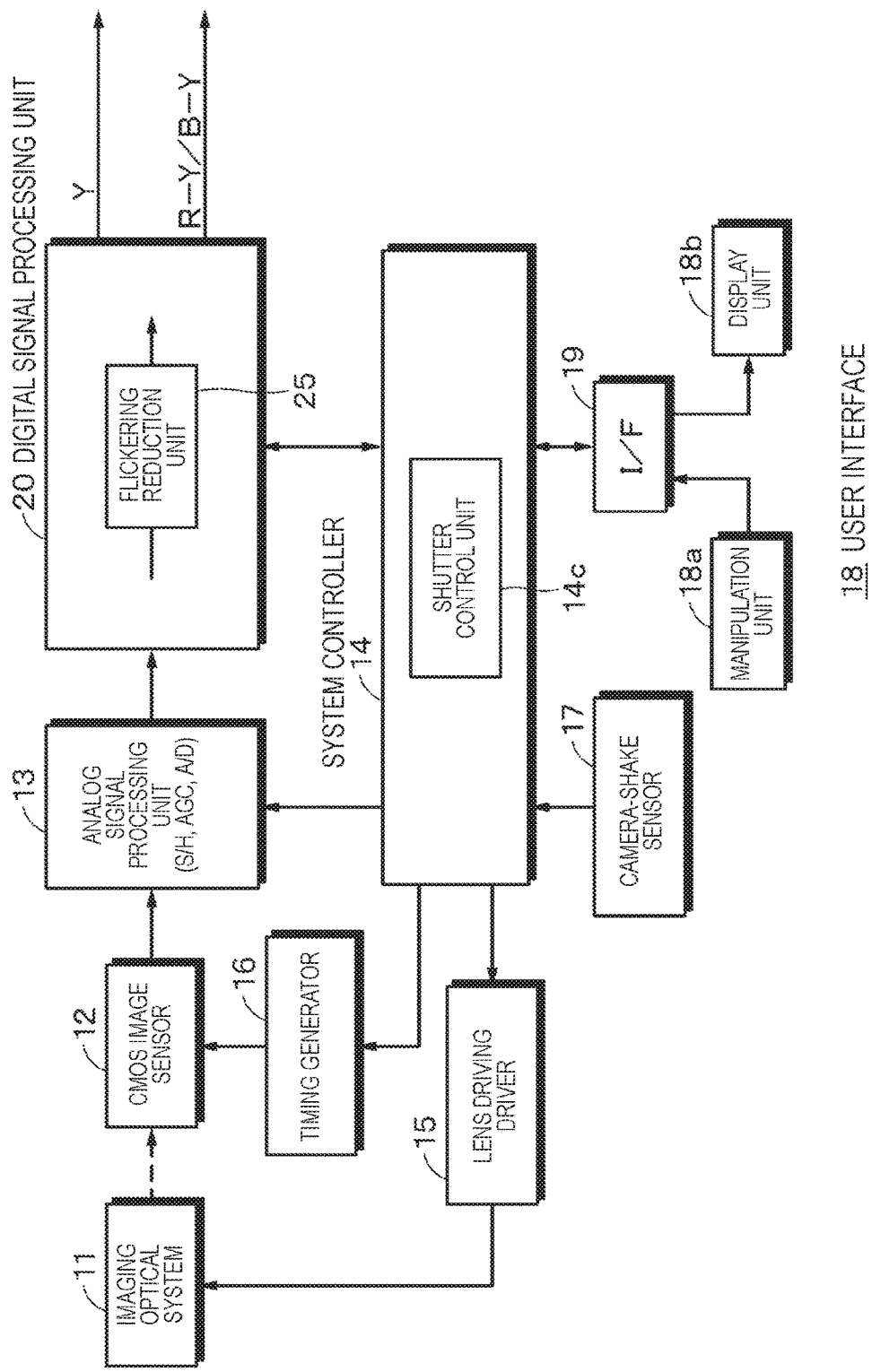
FIG. 1 is a block diagram illustrating a configuration example of an imaging device according to an embodiment of the present technology.

FIG. 1 is a block diagram illustrating a system configuration example of an imaging device (an imaging device 100) according to an embodiment of the present technology. In the imaging device 100, light from a subject is incident on a complementary metal oxide semiconductor (CMOS) image sensor 12 via an imaging optical system 11, the light is photoelectrically converted in the CMOS image sensor 12, and an analog image signal is obtained from the CMOS image sensor 12. For example, the imaging optical system 11 and the CMOS image sensor 12 are included in an imaging unit.

In the CMOS image sensor 12, a plurality of pixels including a photodiode (photo-gate), a transmission gate (a shutter transistor), a switching transistor (an address transistor), an amplification transistor, a reset transistor (a reset gate), and the like are arrayed and formed in a 2-dimensional shape, and a vertical scanning circuit, a horizontal scanning circuit, and a video signal output circuit are formed on a CMOS substrate.

The CMOS image sensor 12 may be one of a primary color system and a complementary color system, as will be described below. An analog image signal obtained from the CMOS image sensor 12 is a primary color signal of each color of RGB or a color signal of a complementary color system.

The analog image signal from the CMOS image sensor 12 is sampled and held for each color signal in the analog signal processing unit 13 configured as an integrated circuit (IC), a gain of the analog image signal is controlled through automatic gain control (AGC), and the analog image signal is converted into a digital signal through analog-to-digital (A/D) conversion.

The digital image signal from the analog signal processing unit 13 is processed, as will be described below, in a digital signal processing unit 20 that is configured as an IC and functions as a detection unit. Then, in a flickering reduction unit 25 in the digital signal processing unit 20, a flickering component is reduced for each signal component, as will be described below, and then the signal is finally converted into color difference signals R−Y and B−Y between red and blue and a luminance signal Y to be output from the digital signal processing unit 20.

A system controller 14 which is an example of a control unit includes a microcomputer or the like and controls each unit of the imaging device 100.

Specifically, a lens driving control signal is supplied from the system controller 14 to the lens driving driver 15 including an IC and a lens or an iris of the imaging optical system 11 is driven by the lens driving driver 15.

In addition, a timing control signal is supplied from the system controller 14 to a timing generator 16 and various timing signals are supplied from the timing generator 16 to the CMOS image sensor 12 so that the CMOS image sensor 12 is driven.

At this time, a shutter speed of the CMOS image sensor 12 is also controlled with a timing control signal from the system controller 14. Specifically, a shutter control unit 14c in the system controller 14 sets a shutter speed.

Further, a detection signal of each signal component is captured from the digital signal processing unit 20 to the system controller 14. The analog signal processing unit 13 controls a gain of each color signal, as described above, with an AGC signal from the system controller 14 and the system controller 14 controls signal processing in the digital signal processing unit 20.

In addition, a camera-shake sensor 17 is connected to the system controller 14 and camera-shake information obtained from the camera-shake sensor 17 is used to correct camera shake.

In addition, a manipulation unit 18a and a display unit 18b included in a user interface 18 are connected to the system controller 14 via an interface 19 including a microcomputer or the like. The system controller 14 detects a setting manipulation, a selection manipulation, or the like in the manipulation unit 18a and the system controller 14 displays a setting state, a control state, or the like of a camera on the display unit 18b. For example, setting regarding whether or not to perform flickerless photographing to be described below can be performed using the manipulation unit 18a.

Note that the imaging device 100 may include a storage device. The storage device may be a device such as a hard disk contained in the imaging device 100 or may be a memory such as a Universal Serial Bus (USB) memory which is detachably mounted on the imaging device 100. In addition, the imaging device 100 may include a communication device. Image data, various kinds of setting data, and the like may be transmitted to and received from an external device via the Internet or the like using the communication device. Communication may be performed as wired communication or may be performed as wireless communication.

"Configuration Example of Digital Signal Processing Unit"

Figure 2:
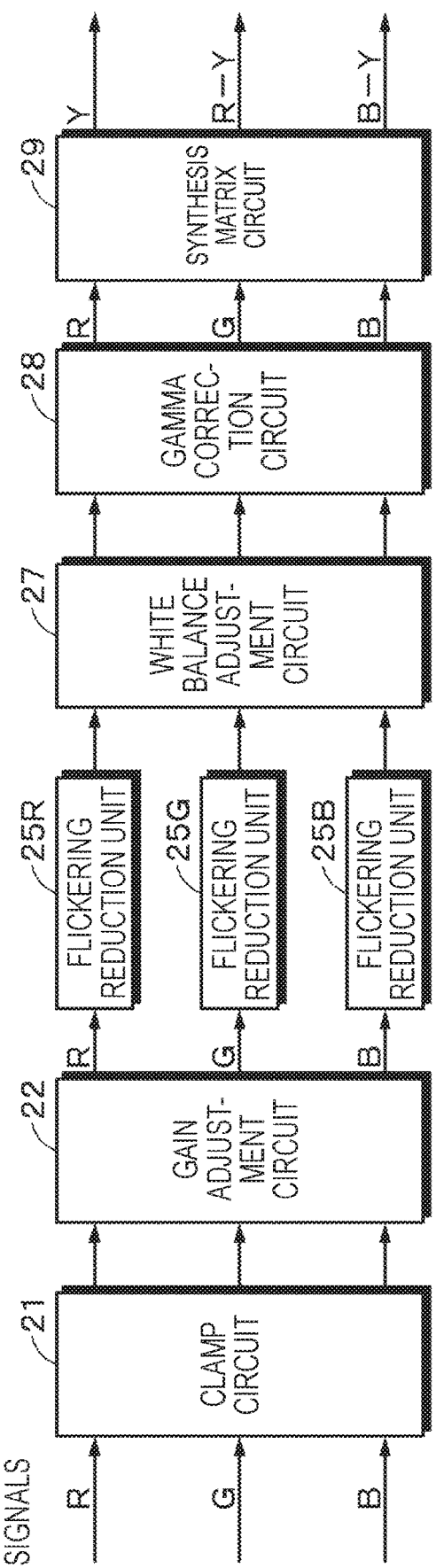
FIG. 2 is a block diagram illustrating a configuration example of a digital signal processing unit according to a first embodiment of the present technology.

FIG. 2 is a block diagram illustrating a configuration example of the digital signal processing unit 20 in the case of a primary color system. The primary color system is a three-plate system in which the imaging optical system 11 in FIG. 1 includes a separation optical system that separates light from a subject into color light with respective colors of RGB and a CMOS image sensor for each color of RGB as the CMOS image sensor 12 or a one-plate system in which one CMOS image sensor in which color filters of respective colors of RGB are arranged sequentially and repeatedly for each one pixel in a screen-horizontal direction on a light incidence surface is included as the CMOS image sensor 12. In this case, RGB primary color signals are read in parallel from the CMOS image sensor 12.

In the digital signal processing unit 20 in FIG. 2, a clamp circuit 21 clamps a black level of the input RGB primary color signals to a predetermined level, a gain adjustment circuit 22 adjusts gains of the RGB primary color signals after the clamping in accordance with an exposure amount, and flickering reduction units 25R, 25G; and 25B reduce flickering components in the RGB primary color signals after the gain adjustment in accordance with a method to be described below. In addition, at the time of photographing, a process is performed to perform flickerless photographing. Note that the flickerless photographing means photographing capable of preventing an influence of flickering occurring from a flickering light source on image quality (reduction in image quality).

Further, in the digital signal processing unit 20 in FIG. 2, a white balance adjustment circuit 27 adjusts white balance of the RGB primary color signals after the reduction of the flickering, a gamma correction circuit 28 converts the gray scales of the RGB primary color signals after the adjustment of the white balance, and a synthesis matrix circuit 29 generates the luminance signal Y and the color difference signals R−Y and B−Y of the output from the RGB primary color signals after the gamma correction.

In the primary color system, in general, the luminance signal Y is generated after the RGB primary color signal has fully ended as in FIG. 2. Therefore, by reducing the flickering components in the RGB primary color signals during the process on the RGB primary color signals as in FIG. 2, it is possible to sufficiently reduce the flickering components of luminance components and each color component.

Here, instead of detecting the flickering component for each primary color signal of each color of RGB by the flickering reduction units 25R, 25Q and 25B and reducing the flickering component as in FIG. 2, for example, a flickering reduction unit 25 may be provided on an output side of the luminance signal Y of the synthesis matrix circuit 29 to detect a flickering component in the luminance signal Y and reduce the flickering component.

On the other hand, the complementary color system is a one-plate system that includes one CMOS image sensor in which color filters of a complementary system are formed on a light incidence surface as the CMOS image sensor 12 in FIG. 1.

In the complementary color system, video signals at two adjacent horizontal line positions are combined and read from the CMOS image sensor 12. The digital signal processing unit 20 clamps a black level of a complementary signal (a synthesized signal) at a predetermined level, adjusts a gain of the complementary signal after the clamping in accordance with an exposure amount, and further generates a luminance signal and RGB primary color signals from the complementary signal after adjustment of the gain.

Then, the flickering component in the luminance signal and the flickering components in the RGB primary color signals are reduced by the flickering reduction unit 25, the gray scale of the luminance signal after the reduction of the flickering is further corrected to obtain the luminance signal Y of the output and the white balance of the RGB primary color signals after the reduction of the flickering is adjusted, the gray scales of the RGB primary color signals after the adjustment of the white balance are converted, and the color difference signals R−Y and B−Y are generated from the RGB primary color signals after the gamma correction.

Operation Examples

"Basic Operation"

Next, an operation example of the imaging device 100 will be described. Here, an example in which a still image is photographed will be described. When the imaging device 100 is powered on, an image (a through image) in a moving image aspect is displayed on the display unit 18b (live-view display) at the time of deciding a composition of (framing) a subject before photographing.

Subsequently, after the subject is decided, a preparation manipulation is performed. The preparation manipulation is a manipulation of preparation to perform photographing and is a manipulation performed immediately before photographing. The preparation manipulation is, for example, a half push manipulation of pushing a shutter button included in the manipulation unit 18a partially (halfway). When the half push manipulation is performed on the shutter button, for example, a preparation operation of capturing a still image of the subject is performed. As the preparation operation of capturing the still image of the subject, a detection operation of detecting focus or setting an exposure control value and light emission of an auxiliary lighting unit, and the like can be exemplified. Note that when the pushing of the shutter button in the half push state is released, the preparation operation ends.

When the shutter button is further pushed from the half push state and the shutter button is fully pushed, the imaging device 100 is instructed to perform photographing and an exposure operation is performed on a subject image (an optical image of the subject) using the CMOS image sensor 12. The analog signal processing unit 13 or the digital signal processing unit 20 performs predetermined signal processing on image data obtained in response to the exposure operation to obtain a still image. The image data corresponding to the obtained still image is appropriately stored in a storage device (not illustrated).

Note that the imaging device 100 may photograph a moving image. In a case in which the moving image is captured, for example, when the shutter button is pushed, photographing of the moving image and recording of the moving image are performed. When the shutter button is pushed again, the photographing of the moving image is stopped.

"Flickering Reduction Process"

Next, a flickering reduction process or the like in the imaging device 100 will be described. The flickering reduction process is, for example, a process performed on a through image in live-view display. Before the description of the flickering reduction process, an example of a flickering component occurring due to a fluorescent lamp or the like in an NTSC system will be described to facilitate understanding. Note that in this example, a case in which a frame rate is set to 60 frames per second (fps) and a commercial power frequency is set to 50 hertz (Hz) will be described. Characteristics of the flickering component occurring in this case are as follows:

(1) generated by 5/3 periods in one screen (3 frames (which may be fields) are set as a repetition period);

(2) a phase is changed for each line; and (3) handled as a sinusoidal wave with a frequency (100 Hz) which is twice the commercial power frequency (50 Hz).

Figure 3:
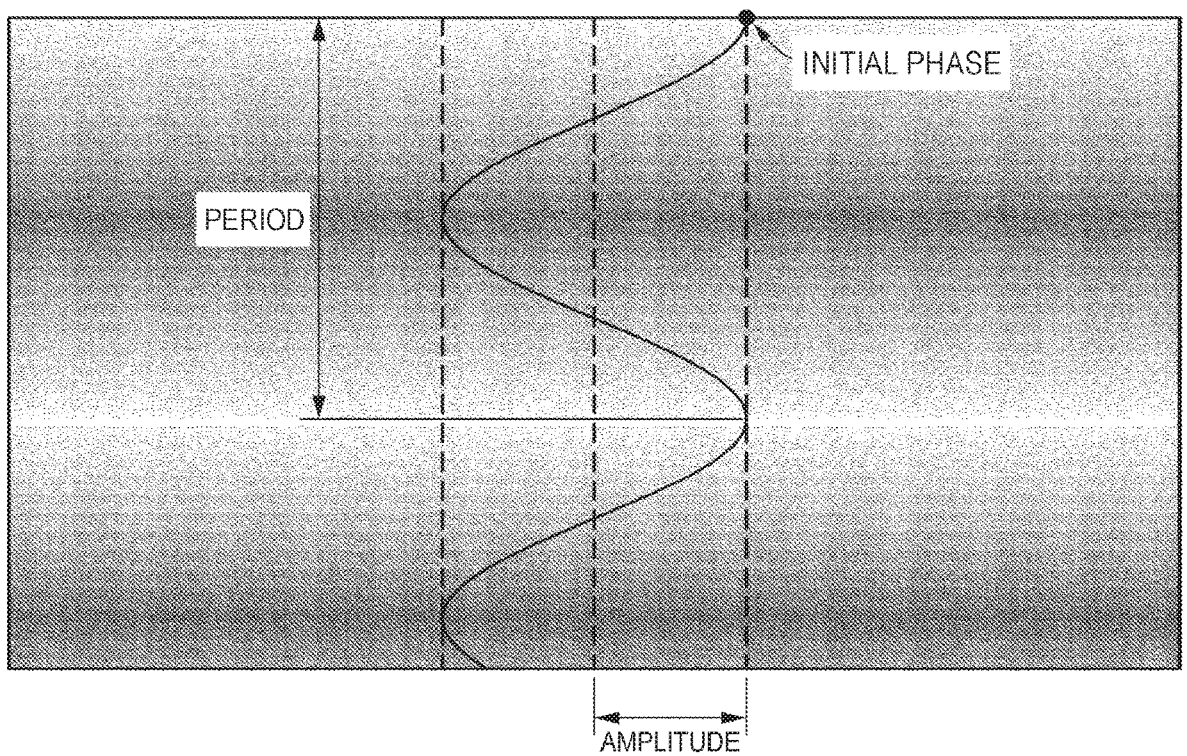
FIG. 3 is a diagram illustrating an example of a flickering component.

From the foregoing characteristics, a flickering component is generated, as illustrated in FIG. 3, when a flickering phenomenon occurs. Note that scanning is assumed to be performed from the upper side (the upper portion of the screen) to the lower side (the lower portion of the screen) in FIG. 3. In the CMOS image sensor 12, since an exposure timing differs for each horizontal line, an amount of received light is changed in accordance with the horizontal line. Accordingly, although the fluorescent lamp or the like illuminates uniformly spatially, there are a horizontal line with a value of a video signal greater than an average value and a horizontal line with a value of a video signal less than the average value as in FIG. 3. For example, in the frames of FIG. 3, a flickering component (an amplitude of the flickering component) in the highest horizontal line in the image, that is, a head line, has the highest peak. Further, in a horizontal line shifted from the head line by lines equivalent to 3/5 of the total number of lines included in one screen, a flickering component is also the highest. In this way, the flickering component can be expressed as a sine function (sinusoidal wave) that has an amplitude, a period, and an initial phase, as illustrated in FIG. 3. Note that in this example, the initial phase means a phase in the head line.

Further, the phase of each horizontal line changes in accordance with a frame. That is, a horizontal line with a value of a video signal greater than the average value and a horizontal line with a value of a video signal less than the average value are changed for each frame. In a subsequent frame, a sinusoidal wave with a different initial phase is formed. For example, when flickering in the fluorescent lamp is generated at 100 Hz and a frame rate is 60 fps, 5 periods of the flickering in the fluorescent lamp are a time equivalent to 3 frames. Accordingly, the initial phase is the same phase every 3 frames. In this way, the flickering component is changed in accordance with the horizontal line and the frames. Note that in the case of a PAL scheme, that is, a case in which the frame rate is 50 fps and the commercial power frequency is 60 Hz, the flickering component can be expressed as a sinusoidal wave that has a period of 5 frames. An example of a process (an operation) of reducing the flickering component that has the foregoing properties will be described.

Figure 4:
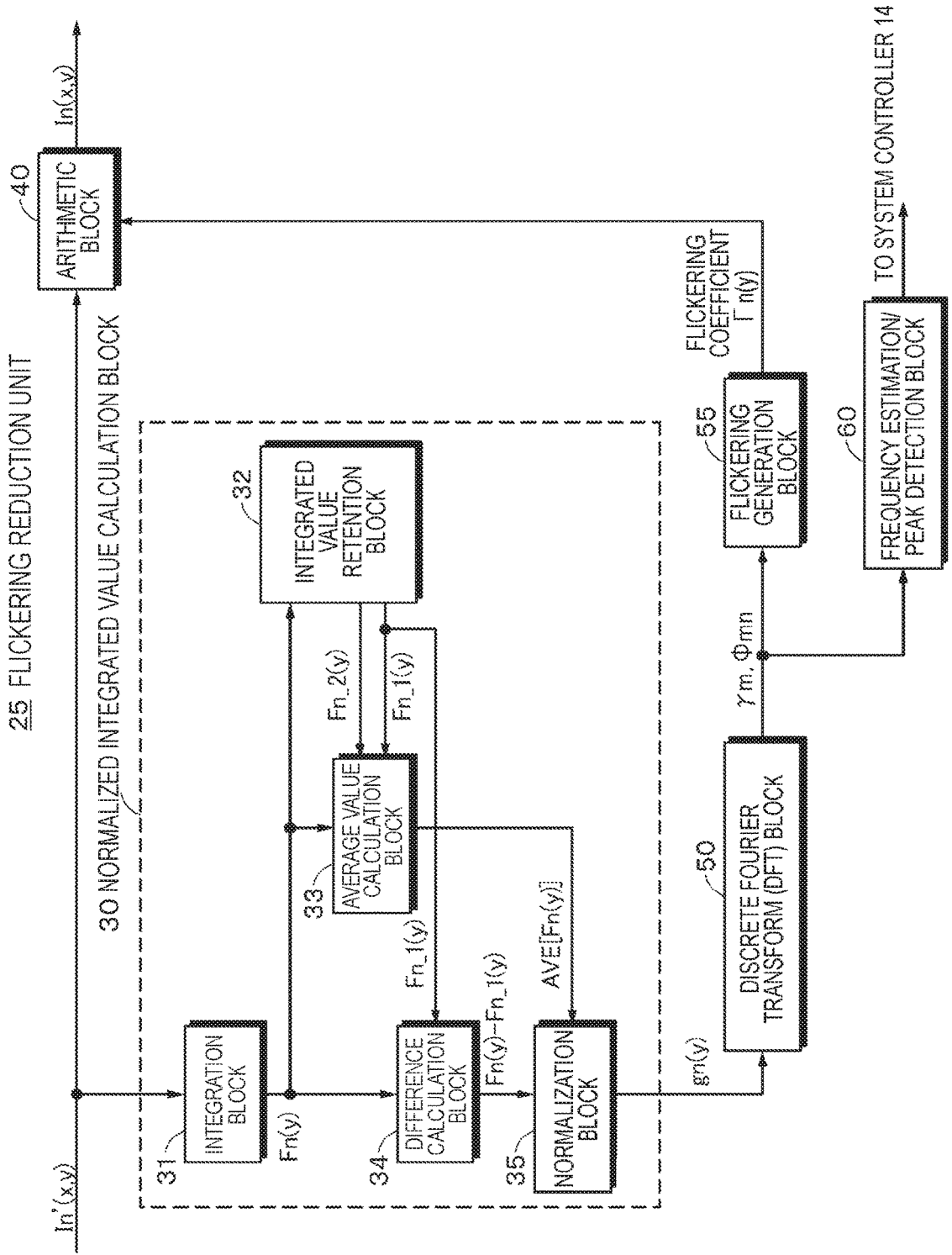
FIG. 4 is a block diagram illustrating a configuration example of a flickering reduction unit according to an embodiment of the present technology.

FIG. 4 is a block diagram illustrating a detailed configuration example of a flickering reduction unit 25. Note that in the following description, input image signals mean RGB primary color signals or a luminance signal before the flickering reduction process input to the flickering reduction unit 25 and output image signals mean the RGB primary color signals or the luminance signal after the flickering reduction process output from the flickering reduction unit 25.

The flickering reduction unit 25 includes, for example, a normalized integrated value calculation block 30, an arithmetic block 40, a discrete Fourier transform (DFT) block 50, a flickering generation block 55, and a frequency estimation/peak detection block 60. The normalized integrated value calculation block 30 includes an integration block 31, an integrated value retention block 32, an average value calculation block 33, a difference calculation block 34, and a normalization block 35.

The integration block 31 calculates an integrated value Fn(y) by integrating one line of an input image signal In'(x, y) in the horizontal direction of the screen. The calculated integrated value Fn(y) is stored and retained for flickering detection in subsequent frames in the integrated value retention block 32. In a case in which a vertical synchronization frequency is 60 Hz, the integrated value retention block 32 may have a configuration capable of retaining an integrated value equivalent to at least 2 frames.

The average value calculation block 33 calculates an average AVE[Fn(y)] of three integrated values Fn(y), Fn_1(y), and Fn_2(y). Note that Fn_1(y) is an integrated value Fn_1(y) of the same line before one frame, Fn_2(y) is an integrated value Fn_2(y) of the same line before two frames, and these integrated values are values read from the integrated value retention block 32.

The difference calculation block 34 calculates a difference between the integrated value Fn(y) supplied from the integration block 31 and the integrated value Fn_1(y) before one frame supplied from the integrated value retention block 32. In the difference Fn(y)–Fn_1(y), an influence of a subject is sufficiently removed. Therefore, the form of a flickering component (a flickering coefficient) is expressed more clearly than in the integrated value Fn(y).

Further, the normalization block 35 performs a normalization process of dividing the difference Fn(y)–Fn_1(y) from the difference calculation block 34 by an average value AVE[Fn(y)] from the average value calculation block 33 to calculate a difference gn(y) after the normalization.

The DFT block 50 performs a discrete Fourier transform on data equivalent to one wavelength (equivalent to L lines) of flickering in a difference gn(y) after the normalization from the normalization block 35. Thus, an amplitude γm and an initial phase Φmn of each subsequent flickering component are estimated. Note that the initial phase Φmn is generated in the imaging device 100 and is retained in association with a counter at each predetermined time (for example, at 0.5 microseconds (µs)).

Further, the flickering generation block 55 calculates a flickering coefficient Γn(y) from estimated values of γm and Φmn from the DFT block 50. Then, the arithmetic block 40 performs a process of adding 1 to the flickering coefficient Γn(y) from the flickering generation block 53 and multiplying an inverse gain by dividing the input image signal In'(x, y) by the sum [1+Γn(y)]. Thus, the flickering component included in the input image signal In'(x, y) is substantially completely removed, and thus a signal component In(x, y) with substantially no flickering component is obtained as an output image signal (the RGB primary color signal or the luminance signal after the flickering reduction process) from the arithmetic block 40.

Through the foregoing flickering reduction process, whether there is flickering can be detected to prevent the quality of a through image from deteriorating due to the flickering. Note that the above-described flickering reduction process may be performed at the time of photographing of a moving image (including recording). Note that in the embodiment, the flickering component is detected for each color of RGB. In this case, a timing of a peak of a color component with the maximum amplitude is detected. Instead, a peak of the luminance signal may be detected.

Note that the initial phase Φmn calculated in the DFT block 50 is supplied to the frequency estimation/peak detection block 60. The frequency estimation/peak detection block 60 estimates at least a frequency of the flickering component (light source), in other words, a period of the flickering component on the basis of the input initial phase Φmn. Further, a timing of the peak of the flickering component is detected. For example, the frequency estimation/peak detection block 60 estimates a frequency of the flickering component from a time difference based on the frame rate and a phase difference of the initial phase Φmn. Further, the frequency estimation/peak detection block 60 detects the initial phase Φmn in an initial frame and a timing of the peak of the flickering component from, for example, a counter associated with the initial phase Φmn.

For example, when the initial phase Φmn is 60 degrees, a timing at which the peak (for example, 90 degrees) of the flickering component approximated to a sinusoidal wave appears can be obtained using a time interval of the counter. The system controller 14 is notified of information obtained by the frequency estimation/peak detection block 60. Note that the peak of the flickering component is a spot at which the amplitude of the flickering component is the maximum, as described above.

In this way, even when a separate sensor or the like is not provided, characteristics (the period of the flickering component, the timing of the peak, or the like) of the flickering component can be detected on the basis of an imaging result (a photographed image obtained via the imaging unit) by the imaging unit. Therefore, it is possible to prevent cost from increasing due to an increase in the number of components. In addition, it is possible to miniaturize the imaging device. Note that the process of obtaining the characteristics of the flickering component is not limited to the above-described method, and a known method can be applied.

"Flickerless Photographing Process"

Next, a flickerless photographing process will be described. The flickerless photographing process is, for example, a process performed in a case in which a flickerless photographing mode is set in the imaging device 100.

In the above-described flickering reduction process, a background component is extracted from an average using an image of a plurality of frames (for example, 3 frames). Therefore, in a case in which the frame rate matches a blinking period of a flickering light source such as a fluorescent lamp, it is difficult to separate a background from flicker, and thus it is difficult to detect the flicker. In addition, the image of the plurality of frames is used. Therefore, in a case in which a still image is captured in flickerless photographing, it is difficult to apply the above-described flickering reduction process without change. Accordingly, in a case in which the still image is captured in the flickerless photographing, a flickerless photographing process to be described below is performed.

First, a process of switching the frame rate at a higher speed than a frame rate at the normal time is performed. The frame rate after the switching is, for example, N times the frequency of the light source (here a frequency greater than a frequency (100 Hz or 120 Hz) of a flickering component) and is preferably one period of the flickering component in a frame. For example, N=4, that is, 200 fps (in the case of the frequency of 50 Hz of the light source) or 240 fps (in the case of the frequency of 60 Hz of the light source), is set.

Note that the frequency of the flickering light source may be obtained from setting of a user or may be set automatically on the basis of a result of the above-described flickering reduction process in live-view display. That is, in a case in which no flickering component is detected in the case of the frame rate of 60 fps in the flickering reduction process, the frequency of the light source is determined to be 50 Hz. In a case in which no flickering component is detected in the case of the frame rate of 50 fps, the frequency of the light source is determined to be 60 Hz. This result may be used in the flickerless photographing process. In addition, whether there is flickering may be detected in the flickerless photographing process.

A timing at which the frame rate is switched can appropriately be set, and is preferably a timing immediately before photographing. For example, the frame rate is switched when a manipulation of pushing the shutter button halfway, which is a photographing preparation manipulation, is performed. More specifically, a manipulation signal in accordance with the manipulation of pushing the shutter button halfway is supplied to the system controller 14 via the interface 19. The system controller 14 controls the timing generator 16 such that the CMOS image sensor 12 is driven and the frame rate is accelerated.

When the frame rate is accelerated, a repetition period of the flickering component is changed. For example, in a case in which the frame rate is 200 fps, the repetition period of the flickering component is 20 frames. In a case in which the frame rate is 240 fps, the repetition period of the flickering component is 12 frames.

Image data can be obtained on the basis of the accelerated frame rate. The obtained image data is subjected to a process by the analog signal processing unit 13 to be input to the digital signal processing unit 20. The image data obtained at the high frame rate is similarly subjected to the above-described flickering reduction process by the flickering reduction unit 25. Further, in this process, the initial phase $\Phi$ mn which is an output from the DFT block 50 is input to the frequency estimation/peak detection block 60 of the flickering reduction unit 25.

The frequency estimation/peak detection block 60 estimates at least a frequency (period) of the flickering component (light source) on the basis of the input initial phase $\Phi$ mn and further detects a timing of a peak of the flickering component.

Figure 5:
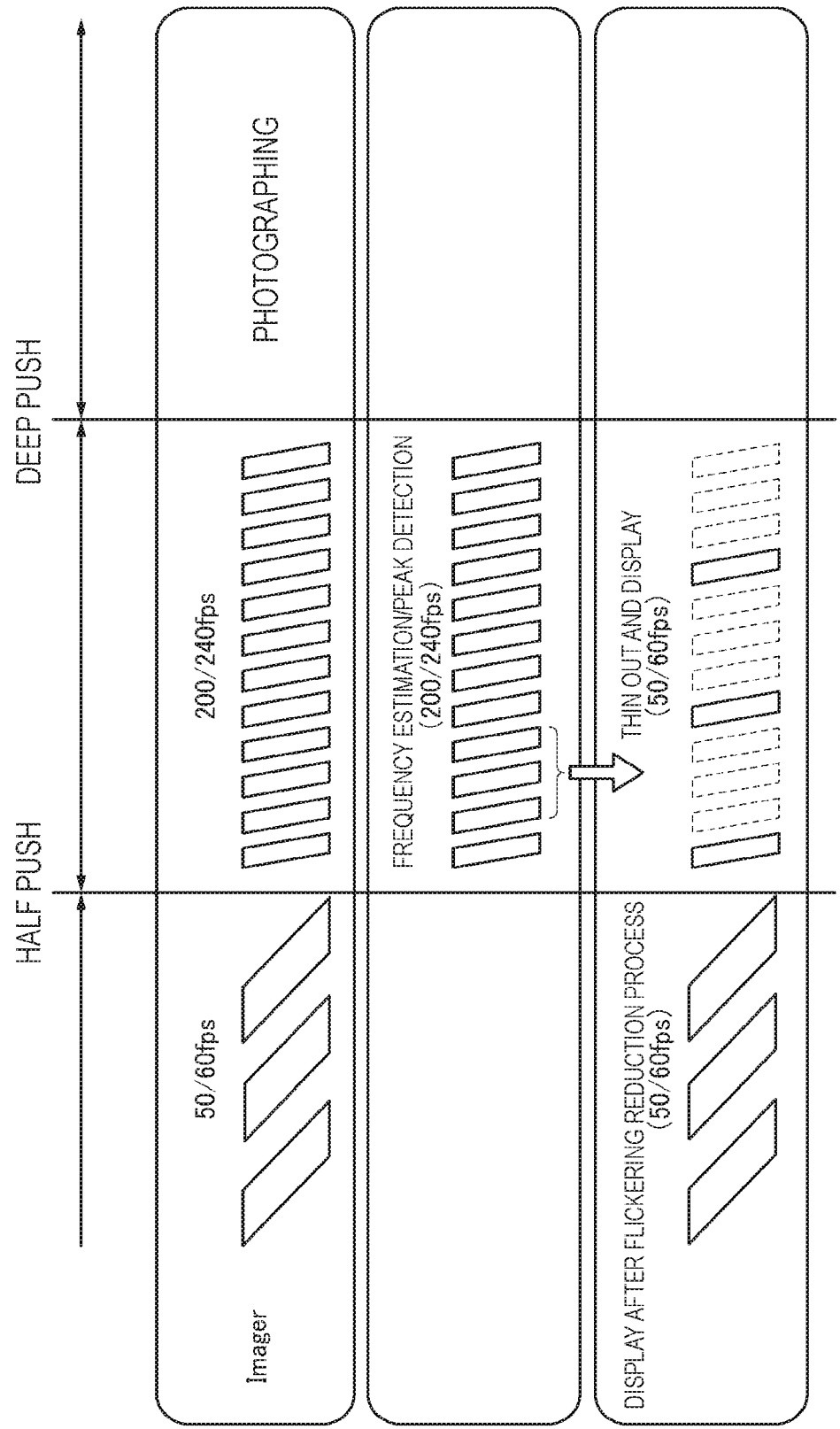
FIG. 5 is an explanatory diagram illustrating an operation example of an imaging device according to an embodiment of the present technology.

FIG. 5 is a diagram for summarizing the above-described process. An image captured at a normal frame rate (for example, 50 or 60 fps) is subjected to the flickering reduction process and the image subjected to the flickering reduction process is displayed as a through image on the display unit 18b. Then, when the shutter is pushed halfway, the frame rate is switched at a high speed (for example, 200 or 240 fps) and frequency estimation and a peak detection process are performed along with the flickering reduction process. Then, the image subjected to the flickering reduction process is displayed on the display unit 18b. Note that from a viewpoint of reducing a bandwidth of data in a display system or a viewpoint of power consumption or the like, the display unit 18b performs display based on image data obtained by thinning out some of the obtained image data. Then, when the shutter button is deeply pushed, photographing is performed.

Figure 6:
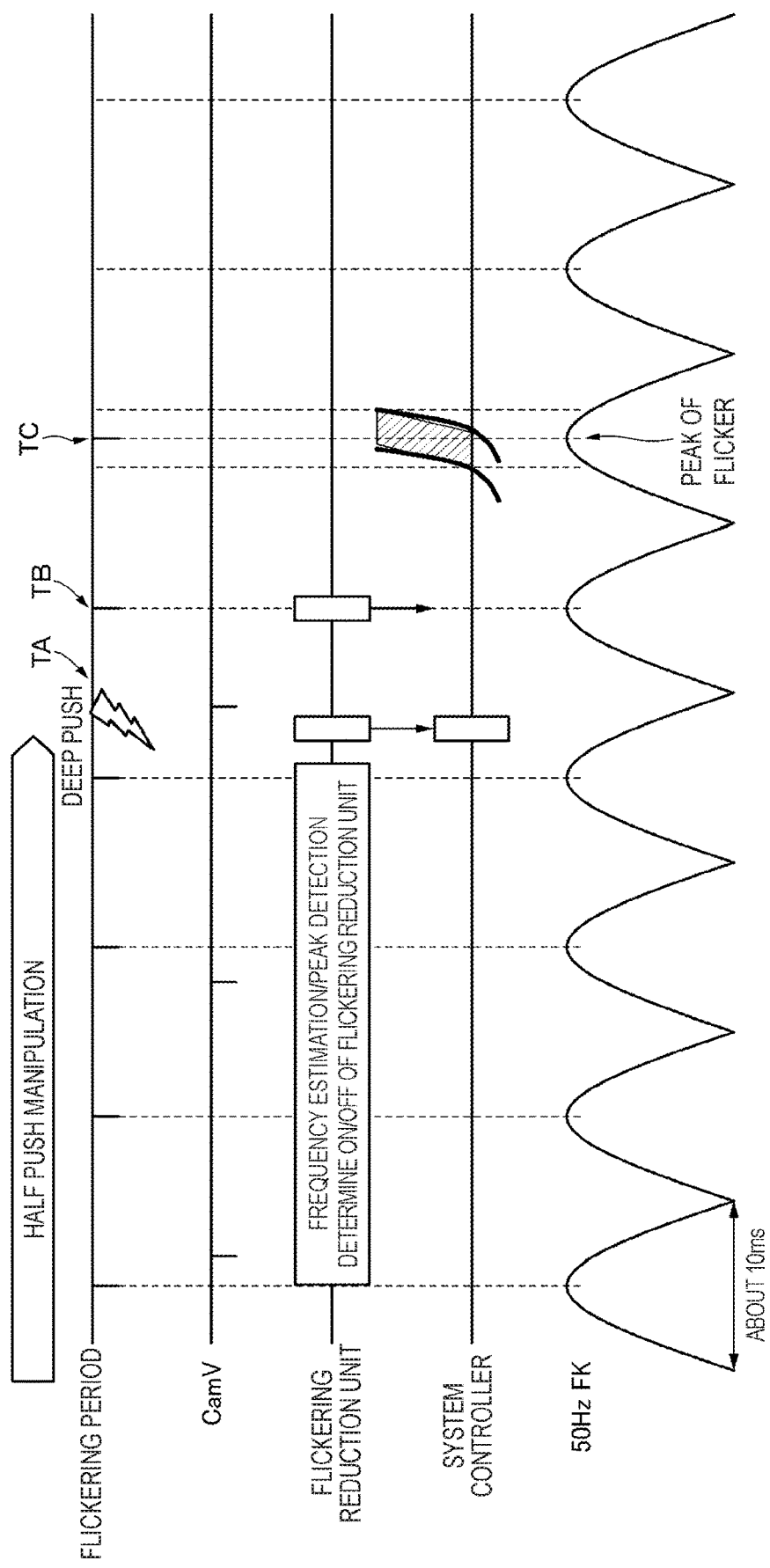
FIG. 6 is an explanatory diagram illustrating an example of a flickerless photographing process.

FIG. 6 is an explanatory diagram illustrating a process in photographing performed in response to a deep push manipulation on the shutter button. As described above, when the manipulation of pushing the shutter button halfway is performed, a frequency of a flickering component is estimated and a process of detecting a timing of a peak is performed. This process is repeatedly performed while the half push manipulation is performed. Note that when the half push manipulation is performed, it is determined whether or not a mode in which the flickerless photographing is performed is set (whether the mode is set to be turned on). Here, in a case in which the mode in which the flickerless photographing is set, a process to be described below is performed.

In FIG. 6, for example, a deep push manipulation on the shutter button is assumed to be performed at a timing TA. In response to the deep push manipulation, the flickering reduction unit 25 notifies of the system controller 14 (the shutter control unit 14c) of a timing of a subsequent peak (in this example, TB) of the flickering component. Note that the timing of the peak herein is, for example, a timing obtained immediately before the deep push manipulation is performed.

The system controller 14 performs photographing in which an exposure timing is caused to be synchronized with the timing of the peak of the flickering component. Note that in the example illustrated in FIG. 6, a latest timing at which the flickering component is a peak is the timing TB. In this example, the exposure timing is caused to be synchronized with a timing (for example, a timing TC) subsequent temporally by a multiple of the period of the flickering component from the timing TB in consideration of delay or the like of a process related to still image photographing. Here, when the process is in time, the exposure timing may be caused to be synchronized with the timing TB.

The photographing in which the exposure timing is caused to be synchronized with the timing of the peak of the flickering component is performed, for example, at a timing at which centers of a shutter speed (exposure time) and a curtain speed match or substantially match the peak of the flickering component. The fact that the centers of the shutter speed and the curtain speed substantially match the peak of the flickering component means that a deviation in the timing is within a range of a predetermined error. Thus, in FIG. 6, a center of gravity (exposure gravity center) of a quadrangle with diagonals indicating an exposure amount matches or substantially matches the peak of the flickering component. Since the exposure timing is normally synchronized with the peak of the flickering component, it is possible to realize the flickerless photographing in which the quality of an image is prevented from deteriorating due to the flickering component.

"Flow of Process"

Figure 7:
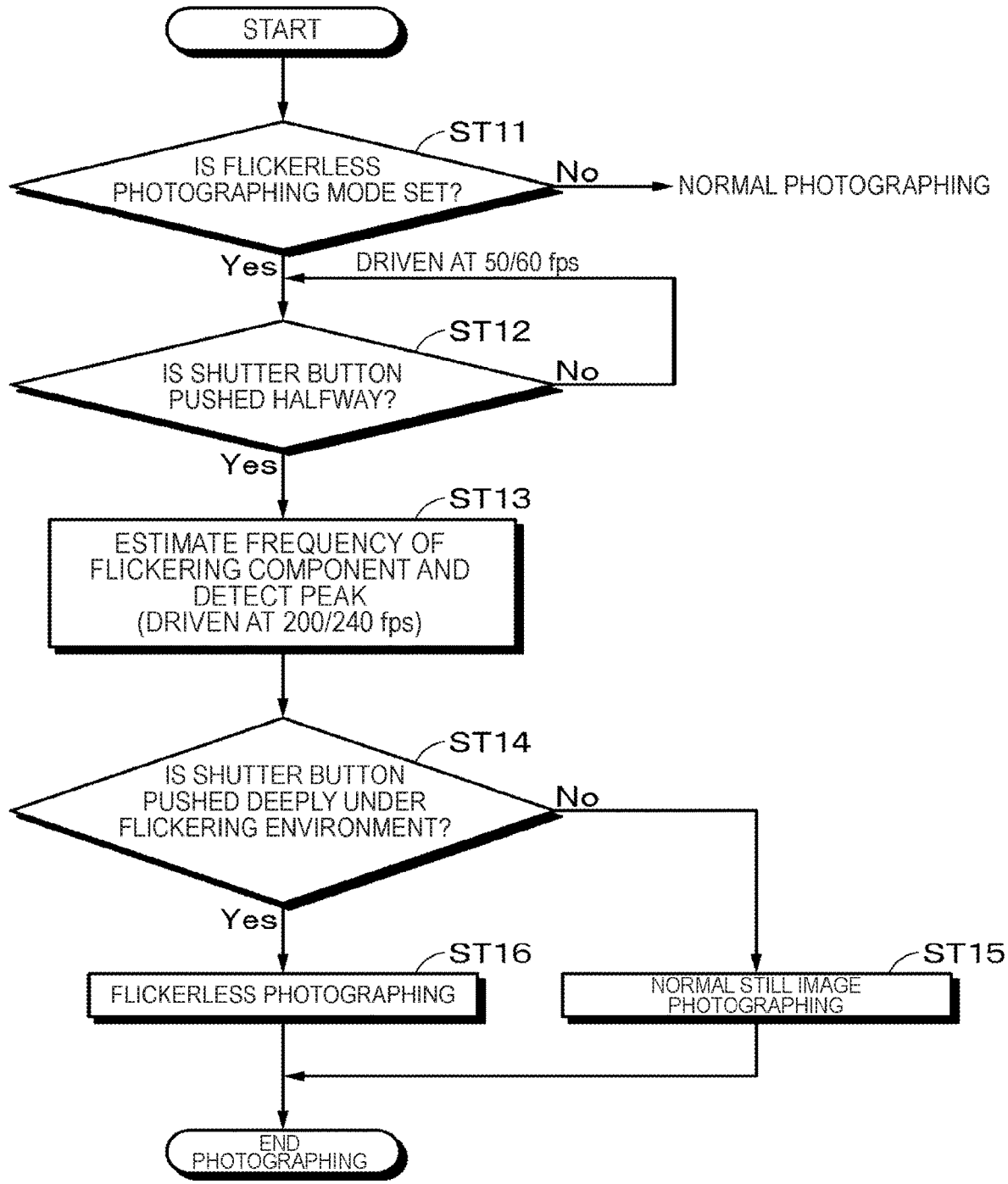
FIG. 7 is a flowchart illustrating an example of a flow of a process according to the first embodiment of the present technology.

FIG. 7 is a flowchart illustrating an example of a flow of a process in the flickerless photographing. In step ST11, the system controller 14 determines whether or not a mode in which the flickerless photographing is performed (a flickerless photographing mode) is set. Here, in a case in which it is determined that the flickerless photographing mode is not set, a process related to normal photographing (herein meaning photographing in which the flickerless photographing process is not performed) is performed in a subsequent process. In a case in which it is determined in step ST11 that the flickerless photographing mode is set, the process proceeds to step ST12.

In step ST12, it is determined whether or not the shutter button included in the manipulation unit 18a is pushed halfway. In a case in which the shutter button is not pushed halfway, the flickering reduction process is performed on an image captured at the normal frame rate (for example, 50 or 60 fps) and the image subjected to the flickering reduction process is displayed as a through image on the display unit 18b. Note that when the flickering reduction process is performed, the flickering reduction process is not performed in a case in which no flickering of outdoor photographing or the like occurs and no flickering component is detected. In a case in which the shutter button is pushed halfway, the process proceeds to step ST13.

In step ST13, the flickerless photographing process is performed in response to the half push manipulation of the shutter button. Specifically, the CMOS image sensor 12 is driven at a high frame rate (for example, 200 or 240 fps), the frequency of the flickering component is estimated using the obtained image data, and a process of detecting a timing at which the peak of the flickering component comes is performed. Note that in a case in which the frequency of the flickering component is estimated in the flickering reduction process, only the process of detecting the timing of the peak of the flickering component may be performed. The system controller 14 is notified of data such as the obtained timing. The foregoing process continues, for example, while the half push manipulation continues. Then, the process proceeds to step ST14.

In step ST14, it is determined whether or not a deep push manipulation on the shutter button is performed under a flickering environment in which flickering occurs. In a case in which it is determined that the deep push manipulation on the shutter button is performed under the environment in which no flickering occurs, the process proceeds to step ST15. In step ST15, a still image photographing process in which the flickerless photographing process is not performed is performed. Conversely, in a case in which the deep push manipulation on the shutter button is performed under the environment in which the flickering occurs, the process proceeds to step ST16.

In step ST16, the flickerless photographing is performed. That is, the photographing in which the exposure timing is caused to be synchronized with the peak of the flickering component obtained in the process of step ST13 is performed. On the other hand, the photographing in which the quality of a still image is prevented from deteriorating due to the flickering component can be performed.

Advantageous Effects of First Embodiment

According to the above-described first embodiment, the following exemplary advantageous effects can be obtained.

It is not necessary to provide a sensor or the like detecting a flickering component, the device can be miniaturized, and thus application to products in a wide variety of categories is possible.

Since the frequency estimation process or the like for a flickering component is performed in accordance with the sufficient number of samplings based on an image based on a high frame rate, it is possible to improve precision of a processing result.

Since a still image is photographed in accordance with a timing of a peak of flicker, it is possible to photograph an image with no variation in color or brightness without being limited by a shutter speed.

Modification Examples of First Embodiment

The above-described first embodiment can be modified as follows, for example.

The flickering reduction process on a through image may not be performed. In this case, whether there is flickering may be detected in a method similar to a flickerless photographing process performed in response to a half push manipulation on the shutter button, that is, a flickering reduction process using image data obtained by exposing an accelerated frame rate.

In addition, in a case in which the deep push operation on the shutter button is performed without performing the half push manipulation, the flickerless photographing process may not be performed or the flickerless photographing process may be performed by delaying the process for a time in which at least one period of the flickering component can be detected.

In the case of bracket photographing, consecutive shoot photographing in which still images are consecutively photographed, or the like, photographing caused to be synchronized with a timing of a peak of a flickering component obtained before consecutive shooting even after the second image may be performed. That is, on the basis of a timing of a peak of a flickering component detected before first exposure, photographing in which a timing after the second exposure is caused to be synchronized with a timing of a peak of the flickering component may be performed.

In a case in which a frame rate is accelerated, a process of strengthening an effect of a process of reducing noise (a noise reduction process) or a process of increasing sensitivity may be performed. In addition, in a case in which luminance is detected and ambient brightness is equal to or less than a threshold or the like, the flickerless photographing process may not be performed.

In the above-described embodiment, the photographing is performed by causing the exposure timing to be synchronized with a timing of a peak of a flickering component. For example, an image obtained through the photographing can be brighter than an image (an image displayed on the display unit 18b) checked by a user in a half push manipulation. Accordingly, a gain control process of decreasing the luminance of the obtained image or the like may be performed.

Through the flickerless photographing, image quality can be prevented from deteriorating due to a flickering component. However, exposure of an image obtained through the photographing, as described above, can be over. Accordingly, for example, exposure correction is performed on an image obtained through the real photographing (for example, photographing performed in response to full pushing of the shutter button) using amplitude information of a flickering component obtained at the time of detection of the flickering component (for example, while the shutter button is pushed halfway. The exposure correction is controlled by, for example, the system controller 14. In a case in which a shutter speed in the detection is the same as a shutter speed in the photographing, an exposure correction amount (a correction amount necessary for the exposure correction) in the photographing can be decided from an amplitude of the flickering component obtained in the detection. For example, the exposure correction may be performed by an amount equivalent to the amplitude of the flickering component during the detection. Conversely, in a case in which the shutter speed in the detection is different from the shutter speed in the photographing, an exposure correction amount necessary in the photographing can be predicted on the basis of the amplitude of the flickering component obtained in the detection.

Hereinafter, the exposure correction will be described specifically. Intensity of a flickering component shown in an image (which is also intensity of blink of flickering and corresponds to an amplitude of the flicker) depends on a shutter speed (an exposure time). An influence of a flickering light source on an image occurs as integration of the exposure time of the blink of the light source. In a case in which the exposure time is short, the blinking of the light source is shown in the image without change. When the exposure time is longer, a difference between the brightest portion and the darkest portion of the blinking becomes smaller because of an integration effect, and thus the blinking completely disappears by the integration in an exposure time which is an integer multiple of a blinking period of the light source. When a relation (a correlation value) between the shutter speed and the flickering component in the image is illustrated, a line L1 in the graph of FIG. 8 is formed.

Figure 8:
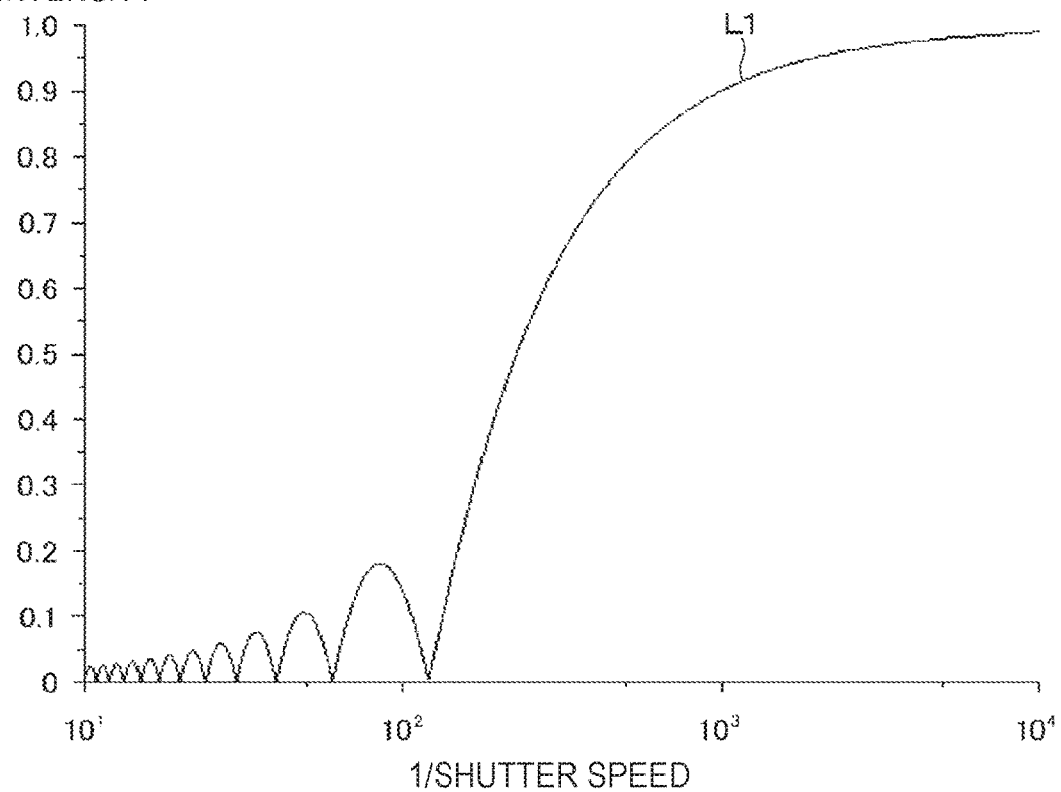
FIG. 8 is an explanatory diagram illustrating an example of a relation between intensity of flickering and a shutter speed.

In the graph of FIG. 8, the horizontal axis represents (1/shutter speed) and the vertical axis represents intensity of normalized flickering (hereinafter appropriately referred to as flickering intensity). Note that the intensity of the normalized flickering is a numerical value expressing the intensity of the flickering for convenience and is also referred to as an amplitude coefficient. The graph of FIG. 8 indicates that the flickering intensity is 0 at an integer multiple of a light source period (for example, $1/100$ seconds). The graph illustrated in FIG. 8 is stored as, for example, a table in the system controller 14. The system controller 14 obtains an appropriate exposure correction amount with reference to the table. Note that numerical values described in the table may be numerical values by actual measurement or may be numerical values by simulation.

Figure 9:
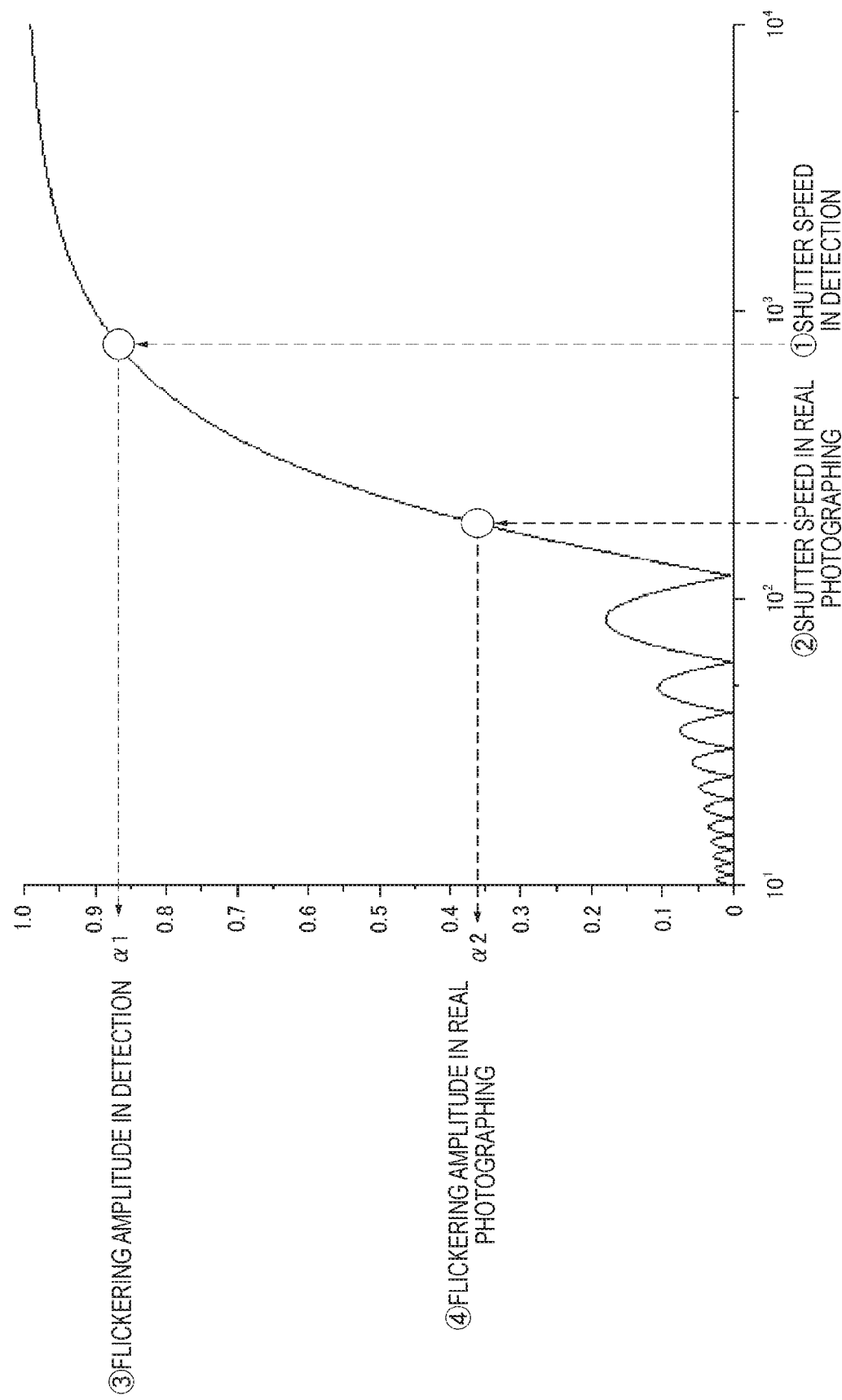
FIG. 9 is an explanatory diagram illustrating an example of control for correcting exposure of an image.

A first example (a control example) in which the exposure correction amount is calculated will be described with reference to FIG. 9. The system controller 14 determines a shutter speed in the detection of the flickering component (hereinafter appropriately referred to as a shutter speed SS1) and a shutter speed in the real photographing (hereinafter appropriately referred to as a shutter speed SS2). These shutter speeds can be determined with reference to setting or the like of the imaging device 100.

The system controller 14 obtains the flickering intensity corresponding to the shutter speed SS1 with reference to the table. For example, the flickering intensity corresponding to the shutter speed SS1 is obtained as α1. In addition, the system controller 14 obtains the flickering intensity corresponding to the shutter speed SS2 with reference to the table. For example, the flickering intensity corresponding to the shutter speed SS2 is obtained as α2.

Subsequently, the system controller 14 obtains an amplitude of the flickering component in the real photographing (an amount of blinking of an unnormalized actual flickering component). The amplitude of the flickering component in the real photographing is given in accordance with Expression (1A) below.

$$\text{Amplitude of flickering component in real photographing} = \text{amplitude of flickering component obtained in detection} \times \alpha2/1 \quad (1A)$$

Note that the amplitude of the flickering component obtained in the detection can be obtained from an output of the DFT block 50.

The system controller 14 sets the amplitude of the flickering component in the real photographing which is a result of Expression (1A) as an exposure correction amount in the real photographing. In the first example, the exposure correction based on the exposure correction amount is performed with a control value other than shutter. For example, the system controller 14 sets a gain so that the gain is the obtained exposure correction amount. The image obtained in the real photographing is multiplied by the set gain. A gain control unit that performs such gain control may be included in the digital signal processing unit 20 and the digital signal processing unit 20 may operate under the control of the system controller 14. In addition, the system controller 14 may control a diaphragm so that a diaphragm value corresponding to the exposure correction amount is set. The gain or the diaphragm value corresponding to the exposure correction amount may be described in, for example, the table or may be obtained by calculation.

Next, a second example in which a correction amount of the exposure correction (hereinafter appropriately referred to as an exposure correction amount) will be described with reference to FIG. 10. The second example is an example in which the shutter speed in the real photographing is changed to correspond to the exposure correction amount. When the shutter speed is faster by the exposure correction, the correction amount is accordingly changed. Accordingly, in the second example, an example of a method of deciding the shutter speed in the real photographing at one time will be described.

Figure 10:
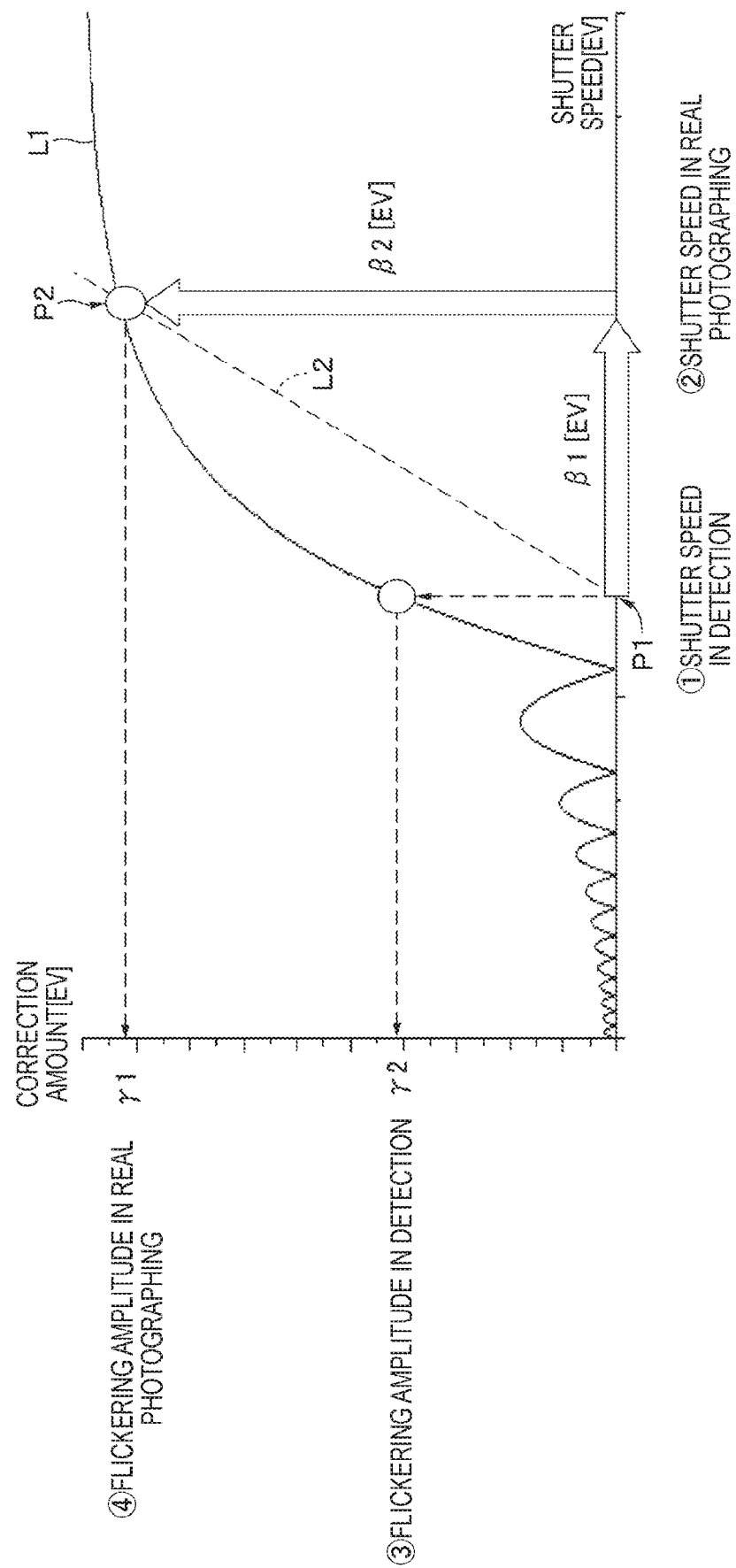
FIG. 10 is an explanatory diagram illustrating another example of the control for correcting exposure of an image.

First, scales of the horizontal axis and the vertical axis of the graph illustrated in FIG. 8 are converted into, for example, exposure values (EVs) in accordance with a known method, as illustrated in FIG. 10. For example, when a correction amount corresponding to the shutter speed in the detection is β2 [EV], the shutter speed is faster by a value corresponding to the correction amount, that is, β1 satisfying β1 [EV]=β2 [EV]. For example, a virtual straight line L2 that has a slope of 1 from an intersection point P1 between the horizontal axis of 0 and the shutter speed in the detection is set.

Then, the system controller 14 identifies a shutter speed corresponding to an intersection point P2 between the line L1 and the line L2 and sets the shutter speed as a shutter speed of the real photographing. In accordance with the foregoing method, the shutter speed in the real photographing can be appropriately set and the exposure of an image can be appropriately corrected. Note that the above-described first example and second example related to the exposure correction may be switched in accordance with a mode or the like set in the imaging device 100. In addition, the relation (a correlation value) between the shutter speed and the amplitude of the flickering component in the image may not be the table, but may be obtained by predetermined calculation or the like.

Other modification examples will be described. When the shutter speed in the imaging device 100 is longer than a predetermined value, an obtained waveform of the flickering component is integrated to approximate a sinusoidal wave. In particular, when the shutter speed is longer than one period (1/100 or 1/120) of the flickering component, the phase of the flickering component is reversed. Accordingly, in a case in which setting of the shutter speed is checked and the shutter speed is longer than one period of the flickering component, the flickerless photographing process may not be performed or a process of correcting a timing of a peak in accordance with a shift of the phase (for example, a shift of 180 degrees) or the like may be performed. In addition, in a case in which a shutter speed longer than one period of the flickering component is set, a process of notifying a user that flickerless photographing may not be performed may be performed.

In the above-described embodiment, the half push manipulation has been exemplified as an example of the preparation manipulation, but the preparation manipulation may be another manipulation such as a manipulation of stopping or substantially stopping the imaging device 100 for a given period or more.

In addition, in the above-described embodiment, the case in which the digital signal processing unit 20 including the flickering reduction unit 25 is configured by hardware has been described, but a part or all of the flickering reduction unit 25 or the digital signal processing unit 20 may be configured by software. In addition, a configuration in which a plurality of flickering reduction units 25 (for example, two flickering reduction units) are provided and processing blocks that separately perform the flickering reduction process on a through image and the flickerless photographing process on image data obtained at a high frame rate are separately set may be adopted.

In the above-described embodiment, the example in which a fluorescent lamp is exemplified as the light source in which flickering occurs has been described, but the present technology is not limited to a fluorescent lamp. The present technology can also be applied to another light source (for example, an LED) as long as the light source blinks with periodicity. In this case, a process of identifying a frequency of an LED may be performed as a preliminary step.

Further, the above-described embodiment can also be applied to an imaging device using an image sensor of an XY address scanning type or a rolling shutter or an image sensor to which a rolling shutter is applied, other than the CMOS image sensor.

2. Second Embodiment

Next, a second embodiment of the present technology will be described. Note that the factors described in the first embodiment (the configuration, the function, and the like of the imaging device 100) can be applied to the second embodiment unless otherwise mentioned.

"Color Deviation in Accordance with Flickering Light Source"

Figure 11:
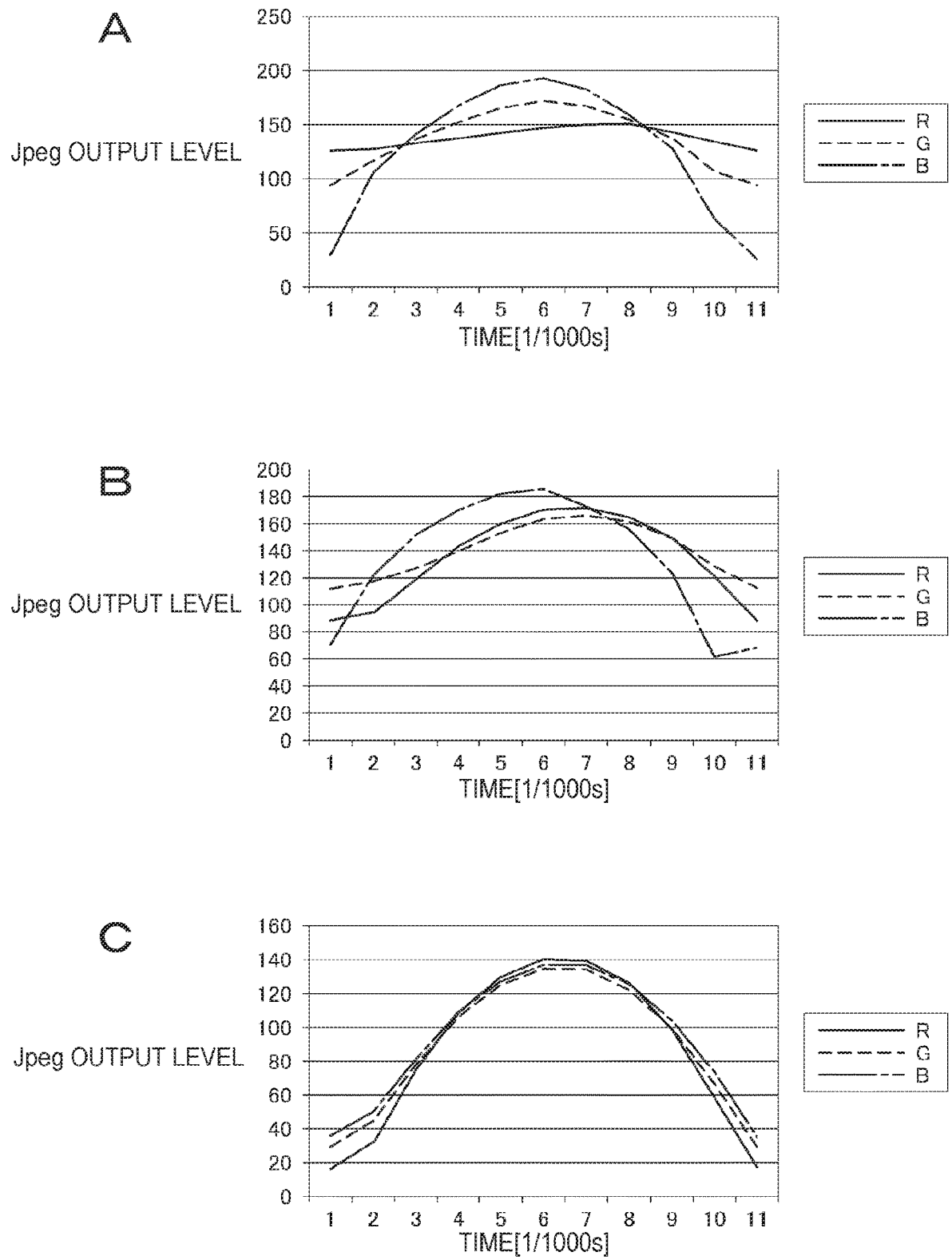
FIGS. 11A, 11B, and 11C are diagrams illustrating waveform examples of RGB in accordance with a flickering light source.

In the first embodiment, the flickerless photographing process of preventing image quality from deteriorating due to a flickering component has been described on the assumption of the case in which photographing is performed under a light source causing flickering (a flickering light source). Incidentally, as the flickering light source, there are many light sources in which waveforms of flickering components are different for each color of RGB in accordance with the kinds of flickering light sources. FIG. 11 is an explanatory diagram illustrating different waveforms for each color of RGB of flickering components in accordance with kinds of flickering light sources. In each of the drawings of FIGS. 11A, 11B, and 11C, the horizontal axis of the graph represents a time and the vertical axis represents an output level of an image with a Joint Photographic Experts Group (JPEG) format. In addition, in the drawings, a solid line indicates a R component, a dotted line indicates a G component, and a one-dot chain line indicates a B component.

FIG. 11A illustrates a waveform example of a flickering component of a neutral white fluorescent lamp. FIG. 11B illustrates a waveform example of a flickering component of a three-wavelength neutral white fluorescent lamp. FIG. 11C illustrates a waveform example of a flickering component of a mercury lamp. As illustrated, it can be understood that waveforms differ for each color of RGB of the flickering component in accordance with the kinds of flickering light sources. There is concern of an influence of the characteristics of the flickering light sources on white balance (tone) of an image obtained through a flickerless photographing process.

Figure 12:
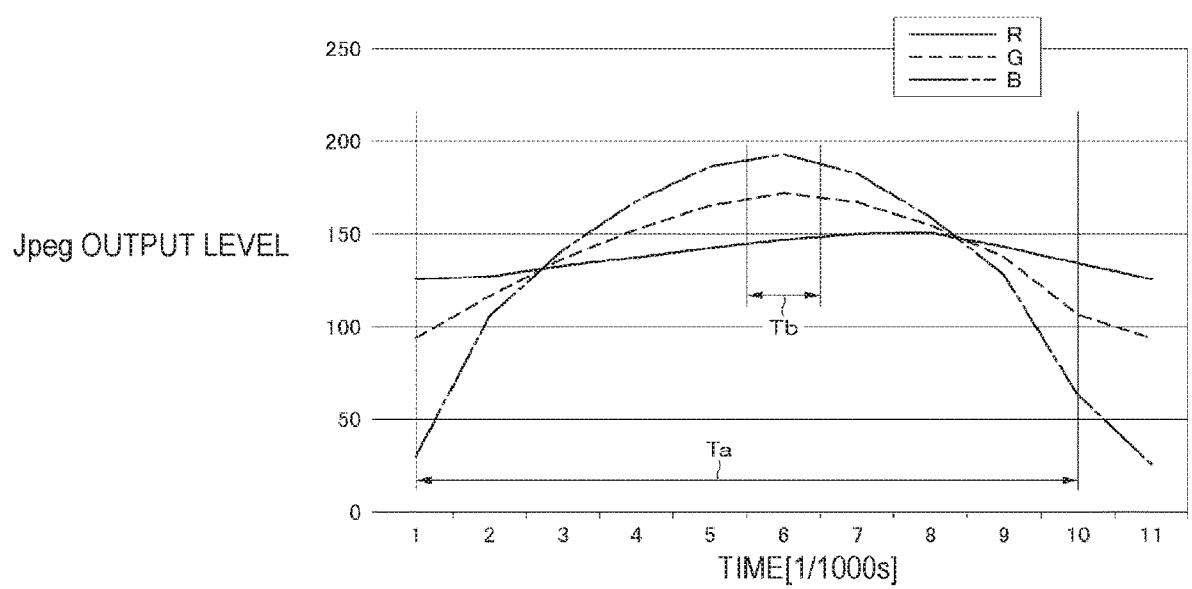
FIG. 12 is an explanatory diagram illustrating a color deviation caused due to flickering of a neutral white fluorescent lamp which is an example of the flickering light source.

FIG. 12 is an explanatory diagram illustrating a color deviation caused due to flickering of the neutral white fluorescent lamp which is an example of the flickering light source. FIG. 12 illustrates two exposure times in a case in which an exposure timing is caused to be synchronized with a timing of a peak of a flickering component. Ta which is a long exposure time is, for example, 1/100 seconds and Tb which is a short exposure time is, for example, 1/1000 seconds. The color of an image obtained for each exposure time is an integrated value obtained by integrating RGB for the exposure time. When the same white balance process is performed on two obtained images, there is concern of the color of the two images obtained by the white balance being different since integrated values of RGB differ. The second embodiment is an embodiment corresponding to this point.

"Configuration Example of Digital Signal Processing Unit"

Figure 13:
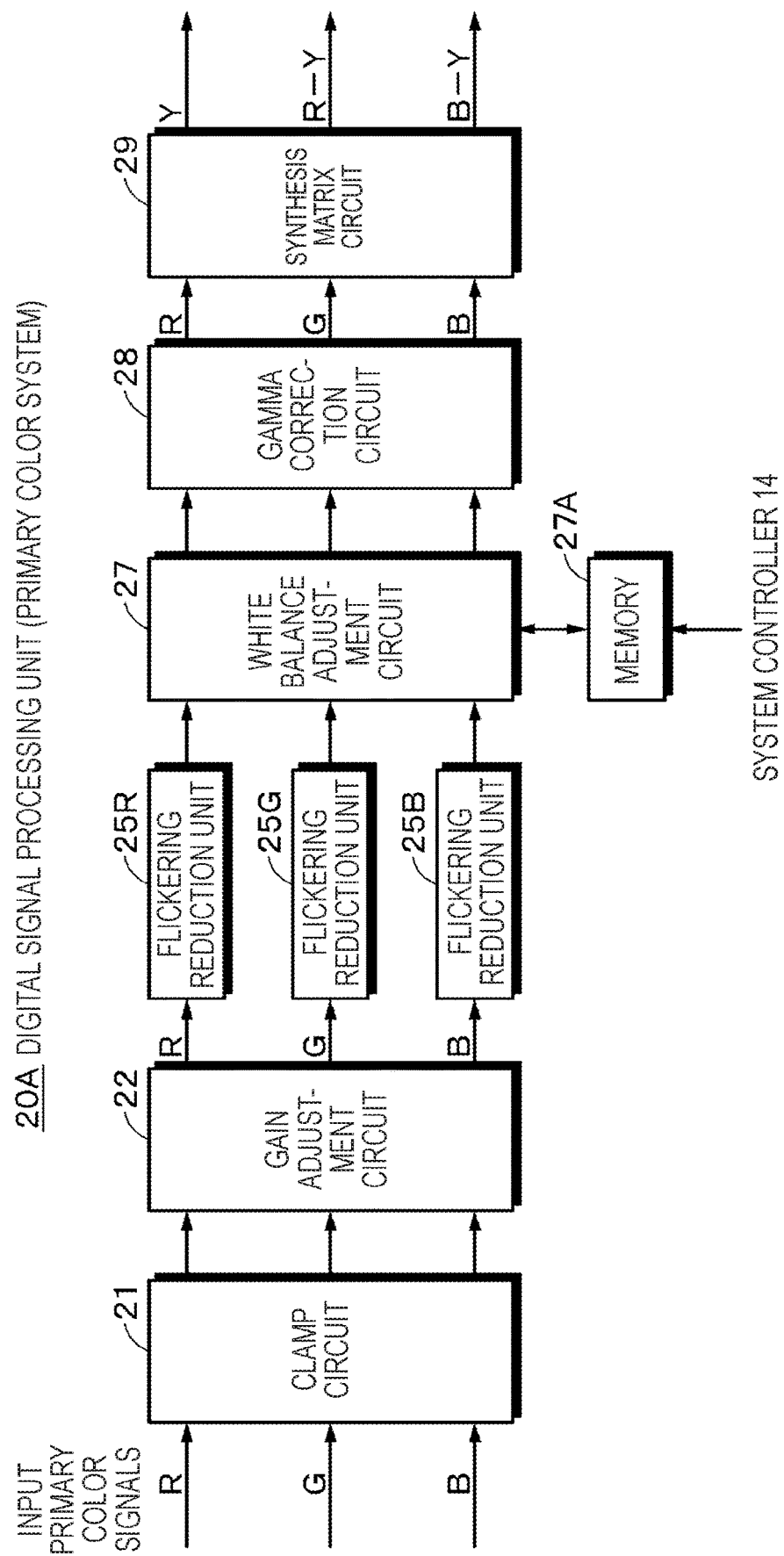
FIG. 13 is a block diagram illustrating a configuration example of a digital signal processing unit according to a second embodiment of the present technology.

FIG. 13 is a diagram illustrating a configuration example of a digital signal processing unit (hereinafter appropriately referred to as a digital signal processing unit 20A) according to the second embodiment. Differences from the digital signal processing unit 20 in the first embodiment will be mainly described. A memory 27A is connected to the white balance adjustment circuit 27. The memory 27A stores a white balance adjustment parameter in accordance with a shutter speed (hereinafter appropriately referred to as a white balance gain). A white balance gain read from the memory 27A under the control of the system controller 14 is set in the white balance adjustment circuit 27. Note that in the embodiment, generation of the white balance gain is controlled by the system controller 14.

"Operation Example"

Next, an operation example of an imaging device (hereinafter appropriately referred to as an imaging device 100A) according to the second embodiment will be described with reference to the flowcharts of FIGS. 14 and 15. Note that the following three modes can be set as setting related to white balance (WB) in the imaging device 100A:
 an auto white balance mode;
 a preset white balance mode; and
 a custom white balance mode.

Of the three modes, the auto white balance mode is a mode in which a white balance gain is automatically set by the imaging device 100A. The preset white balance mode is a mode in which a plurality of representative light sources (the sun, an electric lamp, a fluorescent lamp, or the like) can be selected and a white balance gain optimum for the selected light source is set. The custom white balance mode is a mode in which a user experimentally photographs a spot with an achromatic color on a wall or the like under a use environment of the imaging device 100A (photographs a test) to acquire a white balance gain in accordance with the result.

Figure 14:
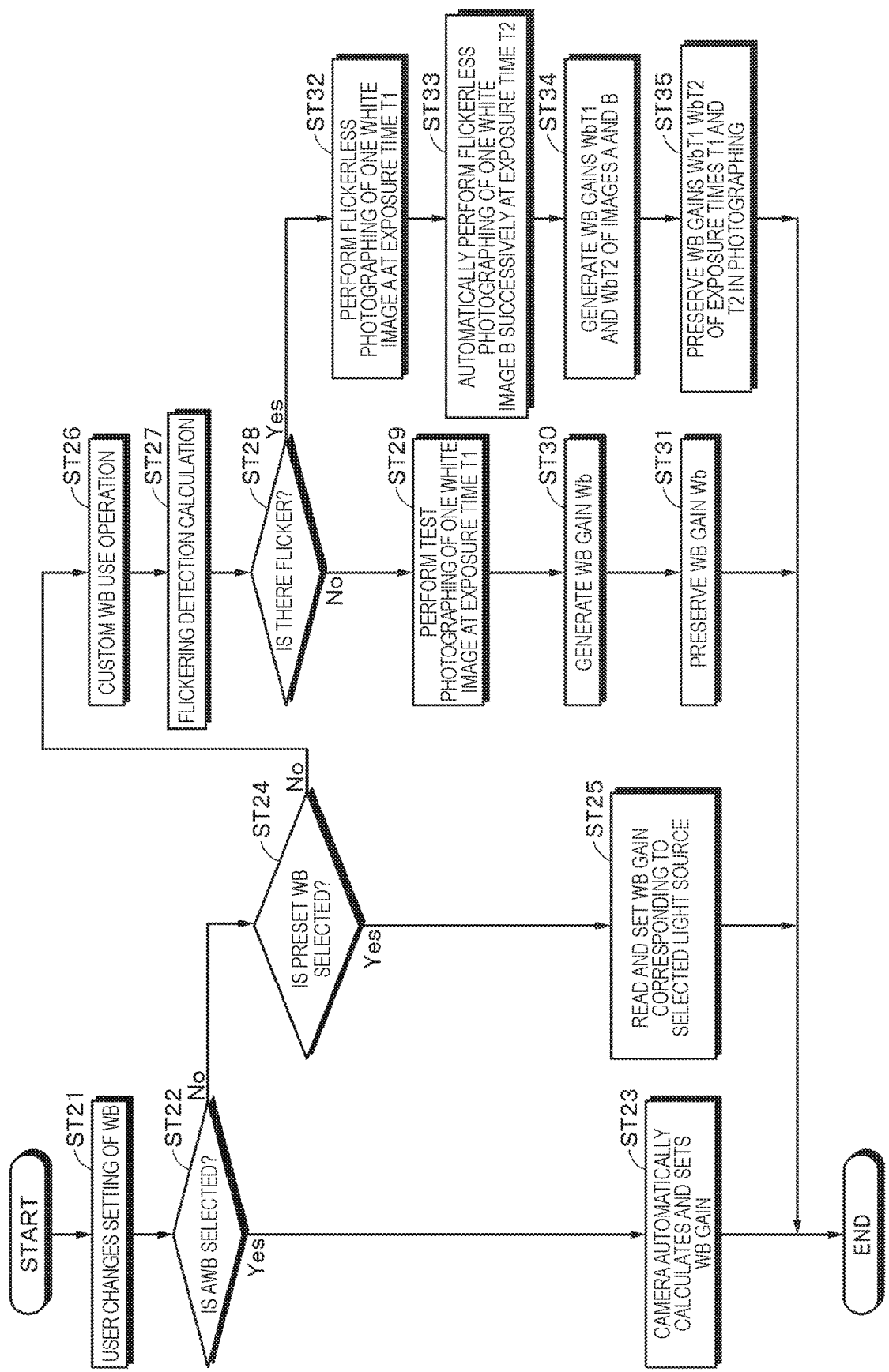
FIG. 14 is a flowchart illustrating an example of a flow of a process according to the second embodiment of the present technology.
Figure 15:
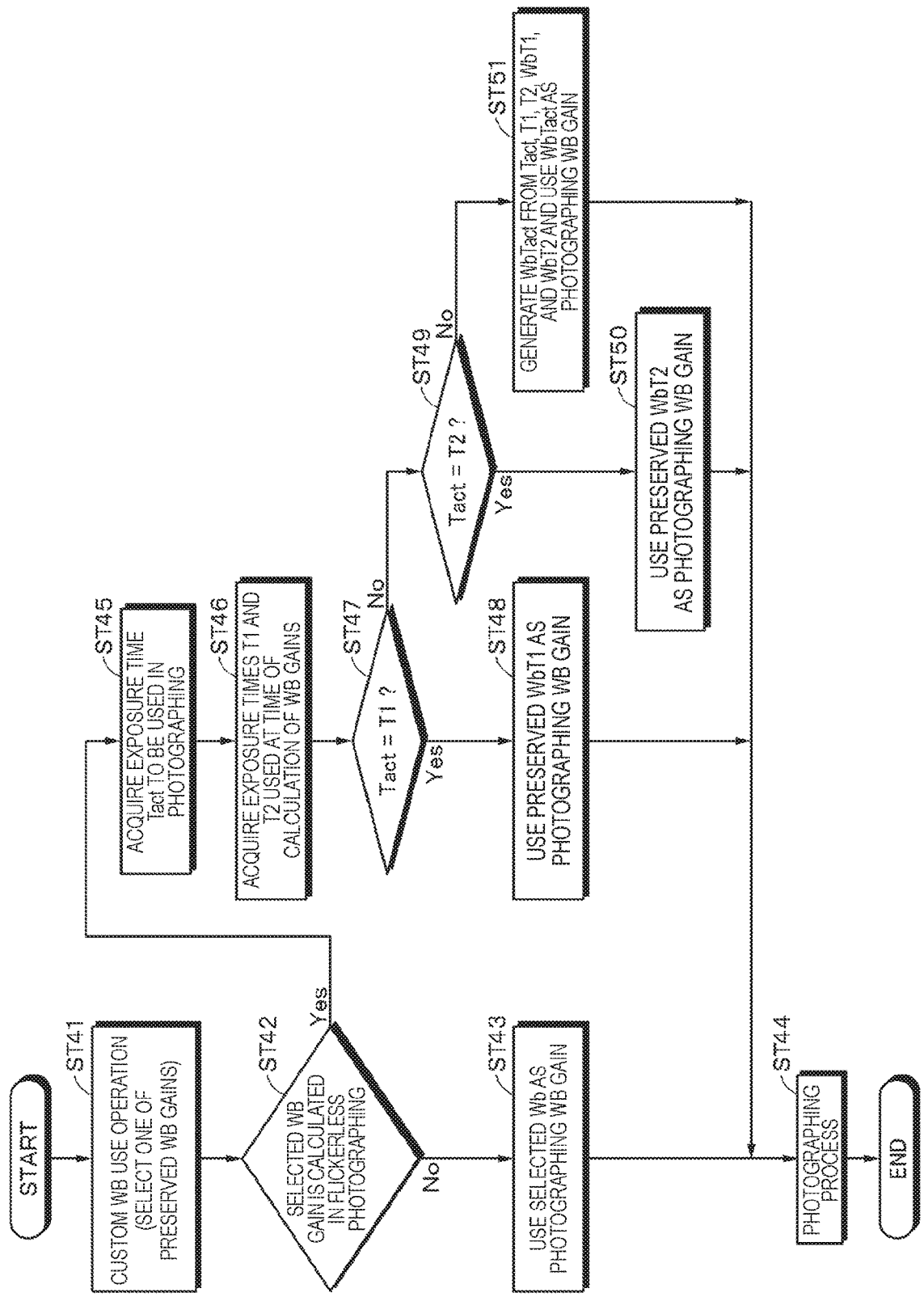
FIG. 15 is a flowchart illustrating an example of a flow of a process according to the second embodiment of the present technology.

In the flow of FIG. 14, the user performs a manipulation of changing setting of the white balance using the manipulation unit 18a in step ST21. Then, the process proceeds to step ST22.

In step ST22, the system controller 14 determines whether or not the auto white balance is set as the setting of the white balance. In a case in which the auto white balance mode is set, the process proceeds to step ST23. In step ST23, for example, the system controller 14 of the imaging device 100A automatically generates a white balance gain and sets the white balance gain in the white balance adjustment circuit 27. In a case in which the set mode of the white balance is not the auto white balance mode in step S22, the process proceeds to step ST24.

In step ST24, the system controller 14 determines whether or not the preset white balance is set as the setting of the white balance. In a case in which the preset white balance mode is set, the process proceeds to step ST25. In step ST25, the white balance gain corresponding to the selected light source is read from the memory 27A and the white balance gain is set in the white balance adjustment circuit 27. In a case in which the set mode of the white balance is not the preset white balance mode in step ST24, the process proceeds to step ST26.

In step ST26, the custom white balance mode is set as the mode of the white balance. Thus, test photographing is performed to generate (obtain) the white balance gain. Note that at this time, display or the like for prompting the test photographing may be performed on the display unit 18b. The test photographing starts and the user turns the imaging device 100A to a spot with an achromatic color and pushes the shutter button. Then, the process proceeds to step ST27.

In step ST27, a driving rate of the CMOS image sensor 12 is controlled such that the frame rate is accelerated (for example, 200 or 240 fps). Then, whether there is a flickering component, a frequency, a timing of a peak, and the like are detected. Note that the details of this process have been described in detail in the first embodiment, and thus the repeated description thereof will be omitted. Then, the process proceeds to step ST28.

In step ST28, the system controller 14 determines whether or not the flickering component is detected in the process of step ST27. In a case in which no flickering component is detected, the process proceeds to step ST29 and a process in accordance with the photographing of a spot of one piece of achromatic color such as white or gray at an exposure time T1 is performed. Note that the exposure time T1 herein is 1/n seconds (where n is a light source frequency, which is 100 or 120 in many cases) at which no flickering occurs. Then, the process proceeds to step ST30.

In step ST30, the system controller 14 generates a white balance gain Wb appropriate for image data obtained in a result of the test photographing. Then, the process proceeds to step ST31. In step ST31, the white balance gain Wb obtained through the process of step ST30 is stored and preserved in the memory 27A in accordance with the control by the system controller 14.

In a case in which the flickering component is detected in step ST28, the process proceeds to step ST32. In step ST32, test photographing is performed to photograph one image of a spot of the achromatic color at the exposure time T1. The test photographing is a flickerless photographing process in which the exposure timing is caused to be synchronized with a timing of a peak of the flickering component, as described in the first embodiment. Then, the process proceeds to step ST33.

In step ST33, test photographing is performed to photograph one image of a spot of the achromatic color at an exposure time T2 subsequently to the photographing of step ST32. The test photographing is also a flickerless photographing process in which the exposure timing is caused to be synchronized with a timing of a peak of the flickering component. Note that the exposure time T2 is, for example, a highest shutter speed which can be set in the imaging device 100A and is 1/8000 seconds in this example. Note that the test photographing in steps ST32 and ST33 is automatically performed successively, for example, when the user pushes the shutter button once to perform the test photographing, and thus the user does not need to push the shutter button twice. Then, the process proceeds to step ST34.

In step ST34, the system controller 14 generates white balance gains WbT1 and WbT2 respectively appropriate for an image A obtained in the test photographing in step ST32 and an image B obtained in the test photographing in step ST33. Then, the process proceeds to step ST35.

In step ST35, the white balance gains WbT1 and WbT2 respectively corresponding to the exposure times T1 and T2 are stored and preserved in the memory 27A in association with the exposure times. Note that the white balance gain obtained in the flickerless photographing is stored in association with a flag indicating the above fact.

Next, a process after the custom white balance mode is selected and the test photographing is performed will be described with reference to the flowchart of FIG. 15.

In step ST41, after the shutter button is pushed for the real photographing (second photographing) of actually photographing a subject, a process of selecting the white balance gain stored in the memory 27A is performed. Note that this selection process may be performed by the user or a recent white balance gain may be selected under the control of the system controller 14. Then, the process proceeds to step ST42.

In step ST42, it is determined whether or not the white balance gain selected in step ST41 is obtained in the test photographing in the flickerless photographing. Note that whether or not the selected white balance gain is obtained in the test photographing in the flickerless photographing can be determined by referring the flag associated with the white balance gain stored in the memory 27A. Here, in a case in which the selected white balance gain is the white balance gain Wb calculated and stored in steps ST30 and ST31 in FIG. 14, the negative determination is performed in step ST42 and the process proceeds to step ST43.

In step ST43, the selected white balance gain Wb is set as the white balance gain to be used in the real photographing in the white balance adjustment circuit 27. Then, the process proceeds to step ST44.

In step ST44, signal processing such as a white balance adjustment process in accordance with the white balance gain Wb is performed on the image data captured in the photographing process of the real photographing. The image data subjected to various kinds of signal processing are appropriately stored.

In a case in which the white balance gain selected in step ST41 is obtained in the test photographing in the flickerless photographing in step ST42, the process proceeds to step ST45. In step ST45, an exposure time (a shutter speed) Tact to be used in photographing is acquired. Then, the process proceeds to step ST46.

In step ST46, the exposure times T1 and T2 used at the time of the generation of the white balance gains are read from the memory 27A. Then, the process proceeds to step ST47.

In step ST47, it is determined whether or not Tact=T1 is satisfied. In a case in which Tact=T1 is satisfied, the process proceeds to step ST48.

In step ST48, the white balance gain WbT1 corresponding to the exposure time T1 is read from the memory 27A and is set in the white balance adjustment circuit 27. Then, the process proceeds to step ST44.

In step ST44, a photographing process is performed. For example, signal processing such as a white balance adjustment process in accordance with a white balance gain Wb1 is performed on the image data obtained through the real photographing. The image data subjected to various kinds of signal processing are appropriately stored.

In a case in which Tact=T1 is not satisfied in step ST47, the process proceeds to step ST49. In step ST49, it is determined whether or not Tact=T2 is satisfied. In a case in which Tact=T2 is satisfied, the process proceeds to step ST50.

In step ST50, the white balance gain WbT2 corresponding to the exposure time T2 is read from the memory 27A and is set in the white balance adjustment circuit 27. Then, the process proceeds to step ST44.

In step ST44, the photographing process is performed. For example, signal processing such as a white balance adjustment process in accordance with a white balance gain Wb2 is performed on the image data obtained through the real photographing. The image data subjected to various kinds of signal processing are appropriately stored.

In a case in which Tact=T2 is not satisfied in step ST49, the process proceeds to step ST51. In step ST51, the system controller 14 applies a white balance gain WbTact corresponding to a different exposure time Tact from the exposure times T1, T2 on the basis of the generated white balance gains WbT1 and WbT2. The white balance gain WbTact can be generated through, for example, a linear interpolation process.

An example of linear interpolation will be described. Note that the following example is an example in which gains for R and B are obtained, but a gain for G may be included.

When a white balance gain (R, B) of the exposure time T1 is (Rt1, Bt1) and a white balance gains (R, B) of the exposure time T2 is (Rt2, Bt2), (Rtx, Btx) which is the white balance gain (R, B) of the exposure time Tact can be expressed with Expressions (1a) and (1b) below.

$$Rtx = Rt1 + \alpha(Rt2 - Rt1) \quad (1a)$$

$$Btx = Bt1 + \alpha(Bt2 - Bt1) \quad (1b)$$

Here, $\alpha$ is an interpolation coefficient and $\alpha=(Tact-T1)/(T2-T1)$ is satisfied.

Note that a relationship between T and an exposure time can be regulated in Expression (1c) below.

$$T = LOG\{(1/\text{exposure time}), 2\} \quad (1c)$$

Note that the above-described interpolation calculation example is merely exemplary and the present technology is not limited thereto.

The white balance gain WbTact corresponding to the exposure time Tact is generated through the process of step ST51 and is set in the white balance adjustment circuit 27. Then, the process proceeds to step ST44.

In step ST44, the photographing process is performed. For example, signal processing such as a white balance adjustment process to which the white balance gain WbTact set for the image data obtained through the real photographing is applied is performed. The image data subjected to various kinds of signal processing are appropriately stored.

Advantageous Effect of Second Embodiment

According to the above-described second embodiment, even in a case in which a shutter speed is variable in the flickerless photographing, the white balance gain process in accordance with the appropriate white balance gain corresponding to the shutter speed can be performed, and thus appropriate color adjustment is possible.

Modification Examples of Second Embodiment

The second embodiment can be modified as follows, for example.

In the above-described second embodiment, two images are obtained by performing the test photographing twice and the white balance gain corresponding to each exposure time is generated on the basis of the two images, but the present technology is not limited thereto. As illustrated in FIG. 16, for example, three images may be obtained by performing test photographing three times by flickerless photographing in which a center of a curtain speed matches a peak of a flickering component, and white balance gains WbT1, WbT2, and WbT3 corresponding to exposure times may be calculated. In addition, test photographing may be performed four or more times. Note that as illustrated in the example of the drawing, a B component is less as the exposure time is longer. Therefore, a B gain is increased or the like.

Exposure times T1, T2, and T3 in FIG. 16 are $\frac{1}{100}$ seconds, $\frac{1}{1000}$ seconds, and $\frac{1}{8000}$ seconds. The exposure times can be appropriately set when the exposure times are not later than one period of a flickering component. In addition, white balance gains corresponding to exposure times on an external side (times out of a range from T1 to T2) may be obtained through interpolation from the white balance gains WbT1 and WbT2 corresponding to the exposure times T1 and T2. The test photographing may be performed from test photographing in which an exposure time is short or may be performed from test photographing in which an exposure time is long.

On a plurality of images obtained in previous flickerless photographing, a white balance gain corresponding to an exposure time may be generated. For example, metadata (accessory information) associated with an image may include information regarding a shutter speed and a white balance gain corresponding to the shutter speed may be generated. In addition, the generated white balance gain may be stored the generated white balance gain can be later. A previously obtained image may be an image stored in the imaging device, may be an image stored in a portable memory, or may be an image downloaded via the Internet or the like.

In the above-described second embodiment, the generated white balance gain may be stored to be used later. In addition, in a case in which positional information of Global Positioning System (GPS) or the like is stored in association with an exposure time (which may be a shutter speed) and a white balance gain and photographing is performed at the same location and the same exposure time, a process of setting a previous white balance gain at that location or presenting the white balance gain to a user may be performed.

In the above-described second embodiment, the timings at which the test photographing and the real photographing are performed are caused to be synchronized with timings of the peaks of the flickering component, but may be synchronized with other timings such as timings of the bottom (which is a portion in which the amplitude is the smallest) of the flickering component. The phase of the flickering component in which the exposure timing is caused to be synchronized may be the same in each photographing.

In the above-described second embodiment, even when the shutter speed may not precisely match T1 or T2 in the processes of steps ST47 and ST49, the white balance gains WbT1 and WbT2 corresponding to T1 and T2 may be used as white balance gains corresponding to the shutter speed as long as an error is within a predetermined range.

The second embodiment can be applied to any of a mechanical shutter, an electronic shutter, a global shutter, a rolling shutter, and the like and can be applied even in a case in which an image sensor is a charge coupled device (CCD).

The light source frequency of the flickering light source is not limited to 100 Hz or 120 Hz, but the present technology can be applied to an LED that blinks at a high speed.

In the above-described second embodiment, even in a case in which a moving image is photographed under a flickering light source, test photographing may be performed in advance in an achromatic chart or the like while an exposure time is changed, and a white balance gain corresponding to the exposure time may be calculated.

In the above-described second embodiment, a subject formed from various kinds of color other than white in a Macbeth chart or the like may be photographed a plurality of times at different exposure times under the flickering light source and a parameter related to color reproduction at each exposure time may be calculated. That is, in the second embodiment of the present technology, it is possible to control generation of parameters that are related to color adjustment at each exposure time and includes at least one of a white balance gain or a parameter related to color reproduction as well as the white balance gains corresponding to different exposure times.

In the above-described second embodiment, the flickerless photographing may be performed during monitoring of a subject and a white balance gain at each exposure time may be generated for a through image obtained in the photographing.

In the above-described second embodiment, the exposure time in step ST45 may automatically be set by the imaging device.

In the above-described second embodiment, the exposure times T1 and T2 in steps ST32 and ST33 may be set to be different in accordance with a kind of flickering light source or a parameter such as a white balance gain may be generated in accordance with a method suitable for the kind of flickering light source.

Before the real photographing, a white balance gain or the like in accordance with a shutter speed set in the imaging device 100 may be generated. In a case in which the real photographing is performed at the shutter speed, a white balance gain or the like generated in advance may be applied.

In the above-described second embodiment, the system controller 14 generates the white balance gains and the like. However, another functional block may generate the white balance gains in accordance with control of the system controller 14.

3. Other Modification Examples

Additionally, the present technology may also be configured as below.

(1)

An imaging control device including:

a control unit configured to perform control such that an exposure timing is synchronized with a timing of a peak of a detected flickering component on the basis of a period of the flickering component and the timing of the peak of the flickering component.

(2)

The imaging control device according to (1), in which the period of the flickering component and the timing of the peak of the flickering component are detected on the basis of an imaging result by an imaging unit.

(3)

The imaging control device according to (1) or (2), in which the control unit controls an imaging unit for switching to a second frame rate which is greater than a first frame rate, and the period of the flickering component and the timing of the peak of the flickering component are detected on the basis of image data based on the second frame rate.

(4)

The imaging control device according to (3), in which the control unit performs control for switching the frame rate in response to a preparation manipulation of preparing to perform photographing.

(5)

The imaging control device according to (4), in which the preparation manipulation is a manipulation of pushing a shutter button halfway.

(6)

The imaging control device according to any one of (1) to (5), further including:

a detection unit configured to detect whether there is the flickering component, in which the detection unit detects the period of the flickering component and the timing of the peak of the flickering component.

(7)

The imaging control device according to any one of (3) to (5), in which the second frame rate is N times (where N is an integer equal to or greater than 3) the first frame rate.

(8)

The imaging control device according to (7), in which first frame rate is 50 or 60 frames per second (fps), and the second frame rate is 200 or 240 fps.

(9)

The imaging control device according to (2), including:

the imaging unit.

(10)

The imaging control device according to any one of (1) to (9), in which the control unit successively performs the control such that the exposure timing is synchronized with the timing of the peak of the flickering component in accordance with setting of photographing.

(11)

The imaging control device according to (10), in which, on the basis of a timing of a peak of the flickering component detected before first exposure, the control is successively performed such that the exposure timing is synchronized.

(12)

The imaging control device according to any one of (1) to (11), in which the control unit does not perform the control in a case in which ambient brightness is equal to or less than a predetermined value.

(13)

The imaging control device according to any one of (3) to (5), in which an additional process is performed in a case in which the frame rate is switched.

(14)

The imaging control device according to (13), in which the additional process is at least one of a process of increasing sensitivity or a process of strengthening a noise reduction effect.

(15)

The imaging control device according to any one of (1) to (14), in which the control unit performs control such that exposure of an image obtained in response to the control is corrected.

(16)

The imaging control device according to (15), in which the control unit controls the exposure of the image on the basis of a correction value obtained from a relation between intensity of flickering and a shutter speed.

(17)

The imaging control device according to (15), in which the control unit controls the exposure of the image by obtaining a shutter speed in the control on the basis of a correction amount of the flickering component and a shutter speed in the detection and setting the shutter speed.

(18)

The imaging control device according to any one of (1) to (17), in which the control unit determines whether or not to perform the control in accordance with a set shutter speed.

(19)

An imaging control method including:

performing, by a control unit, control such that an exposure timing is synchronized with a timing of a peak of a detected flickering component on the basis of a period of the flickering component and the timing of the peak of the flickering component.

(20)

A program causing a computer to perform an imaging control method of performing, by a control unit, control such that an exposure timing is synchronized with a timing of a peak of a detected flickering component on the basis of a period of the flickering component and the timing of the peak of the flickering component.

The imaging device in the above-described embodiments may be embedded in a medical device, a smartphone, a computer device, a game device, a robot, a surveillance camera, or a moving object (a train, an airplane, a helicopter, a small flying body, or the like).

The embodiments of the present technology have been described specifically above, but the present technology is not limited to the above-described embodiments and can be modified in various forms based on the technical ideals of the present technology. For example, the configurations, the methods, the processes, the shapes, the materials, the numerical values, and the like exemplified in the above-described embodiments are merely exemplary and other different configurations, methods, processes, shapes, materials, numerical values, and the like may be used as necessary. Configurations for realizing the above-described embodiments and the modification examples may be appropriately added. In addition, the present technology is not limited to a device and the present technology can be realized by any form such as a method, a program, and a recording medium on which the program is recorded.

REFERENCE SIGNS LIST 100 imaging device
11 imaging optical system
12 CMOS image sensor
14 system controller
20 digital signal processing unit
25, 25R, 25G, 25B flickering reduction unit
27 white balance adjustment circuit

The invention claimed is:

1. An imaging control device, comprising:
processing circuitry configured to
determine that a shutter button is in a half-pushed state,
in response to the determination that the shutter button is in the half-pushed state,
calculate an initial phase of a flickering component of a signal component based on input image signals,
estimate a frequency of the flickering component based on a frame rate of an image sensor and the calculated initial phase, and
detect a timing of a peak of the flickering component,
determine that the shutter button is in a fully-pushed state, and
in response to the determination that the shutter button is in the fully-pushed state, synchronize an exposure timing with the timing of the peak of the flickering component on a basis of the frequency of the flickering component and the timing of the peak of the flickering component,
wherein the processing circuitry is configured to detect whether the flickering component exists in each color of primary color signals of the input image signals.

2. The imaging control device according to claim 1, wherein
the frequency of the flickering component and the timing of the peak of the flickering component are detected on a basis of an imaging result.

3. The imaging control device according to claim 1, wherein
the processing circuitry is configured to increase an initial frame rate of the image sensor to the frame rate of the image sensor, and
the frequency of the flickering component and the timing of the peak of the flickering component are detected on a basis of image data obtained based on the increased frame rate of the image sensor.

4. The imaging control device according to claim 3, wherein the processing circuitry is further configured to increase the initial frame rate of the image sensor in response to the determination that the shutter button is in the half-pushed state.

5. The imaging control device according to claim 1, wherein
the primary color signals include red, green, and blue (RGB) primary color signals.

6. The imaging control device according to claim 3, wherein the increased frame rate is N times the initial frame rate, where N is an integer equal to or greater than 3.

7. The imaging control device according to claim 6, wherein
the initial frame rate is 50 or 60 frames per second (fps), and
the increased frame rate is 200 or 240 fps.

8. The imaging control device according to claim 1, wherein the processing circuitry is further configured to synchronize the exposure timing with the timing of the peak of the flickering component in accordance with a setting of photographing on a display.

9. The imaging control device according to claim 8, wherein the timing of the peak of the flickering component is detected before first exposure.

10. The imaging control device according to claim 1, wherein the processing circuitry does not synchronize the exposure timing when detected ambient brightness is equal to or less than a predetermined value.

11. The imaging control device according to claim 3, the processing circuitry is further configured to perform an additional process when the initial frame rate is increased to the frame rate.

12. The imaging control device according to claim 11, wherein the additional process is at least one of a process of increasing sensitivity or a process of strengthening a noise reduction effect.

13. The imaging control device according to claim 1, wherein the processing circuitry is further configured to perform control such that exposure of an image obtained in response to the control is corrected.

14. The imaging control device according to claim 13, wherein the processing circuitry is further configured to control the exposure of the image on a basis of a correction value obtained from a relation between intensity of the flickering component and a shutter speed.

15. The imaging control device according to claim 13, wherein the processing circuitry is further configured to control the exposure of the image by obtaining a shutter speed in photographing on a basis of amplitude information of the flickering component and a shutter speed in detection and setting the shutter speed.

16. The imaging control device according to claim 1, wherein the processing circuitry is further configured to determine whether to synchronize the exposure timing with the timing of the peak of the flickering component in accordance with a set shutter speed.

17. An imaging control method, comprising:
 determining that a shutter button is in a half-pushed state;
 in response to the determination that the shutter button is in the half-pushed state,
  calculating an initial phase of a flickering component of a signal component based on input image signals,
  estimating a frequency of the flickering component based on a frame rate of an image sensor and the calculated initial phase, and
  detecting a timing of a peak of the flickering component;
 determining that the shutter button is in a fully-pushed state; and
 in response to the determination that the shutter button is in the fully-pushed state, synchronizing an exposure timing with the timing of the peak of the flickering component on a basis of the frequency of the flickering component and the timing of the peak of the flickering component,
 wherein the method further includes detecting whether the flickering component exists in each color of primary color signals of the input image signals.

18. A non-transitory computer-readable storage medium storing instructions, which when executed by at least one processor, cause the at least one processor to perform an imaging control method, the imaging control method comprising:
 determining that a shutter button is in a half-pushed state;
 in response to the determination that the shutter button is in the half-pushed state,
  calculating an initial phase of a flickering component of a signal component based on input image signals,
  estimating a frequency of the flickering component based on a frame rate of an image sensor and the calculated initial phase, and
  detecting a timing of a peak of the flickering component;
 determining that the shutter button is in a fully-pushed state; and
 in response to the determination that the shutter button is in the fully-pushed state, synchronizing an exposure timing with the timing of the peak of the flickering component on a basis of the frequency of the flickering component and the timing of the peak of the flickering component,
 wherein the method further includes detecting whether the flickering component exists in each color of primary color signals of the input image signals.

* * * * *